(12) United States Patent
Pivovar et al.

(10) Patent No.: US 12,465,888 B1
(45) Date of Patent: Nov. 11, 2025

(54) LIQUID SORBENT-ENHANCED AMMONIA PRODUCTION

(71) Applicant: Alliance for Sustainable Energy, LLC, Golden, CO (US)

(72) Inventors: Bryan Pivovar, Arvada, CO (US); Nicholas Thornburg, Denver, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 18/807,603

(22) Filed: Aug. 16, 2024

(51) Int. Cl.
| | |
|---|---|
| *B01D 53/58* | (2006.01) |
| *B01D 53/14* | (2006.01) |
| *B01D 53/78* | (2006.01) |
| *B01D 53/96* | (2006.01) |

(52) U.S. Cl.
CPC ......... *B01D 53/58* (2013.01); *B01D 53/1418* (2013.01); *B01D 53/1425* (2013.01); *B01D 53/1493* (2013.01); *B01D 53/78* (2013.01); *B01D 53/96* (2013.01); *B01D 2251/502* (2013.01); *B01D 2251/512* (2013.01); *B01D 2257/406* (2013.01)

(58) Field of Classification Search
CPC ............... B01D 53/58; B01D 53/1418; B01D 53/1425; B01D 53/1493; B01D 53/78; B01D 53/96; B01D 2251/502; B01D 2251/512
USPC .......................................................... 423/238
See application file for complete search history.

(56) References Cited

U.S. PATENT DOCUMENTS

| | | | |
|---|---|---|---|
| 1,631,720 A | 6/1927 | Davis et al. | |
| 1,936,864 A | 11/1933 | Sperr | |
| 2,500,291 A | 3/1950 | Libel et al. | |
| 3,024,090 A | 3/1962 | Rice | |
| 3,186,795 A | 6/1965 | Fields et al. | |
| 3,985,863 A | 10/1976 | Rice et al. | |
| 4,148,866 A * | 4/1979 | Becker .................. | C01C 1/0405 422/148 |
| 4,784,783 A | 11/1988 | Erickson | |
| 2003/0215377 A1 | 11/2003 | Blonigen et al. | |
| 2015/0175433 A1 | 6/2015 | Micka et al. | |
| 2017/0152149 A1 | 6/2017 | Malmali et al. | |

(Continued)

FOREIGN PATENT DOCUMENTS

| | | |
|---|---|---|
| WO | 2017065925 | 4/2017 |
| WO | 2021097221 | 5/2021 |

OTHER PUBLICATIONS

Doonan et al., "Exceptional ammonia uptake by a covalent organic framework", Nature Chemistry, 2010, vol. 2, pp. 235-238.

(Continued)

*Primary Examiner* — Anita Nassiri-Motlagh
(74) *Attorney, Agent, or Firm* — Michael A. McIntyre

(57) ABSTRACT

The present disclosure relates to a method that includes, in a first zone, contacting an ammonia-rich gas comprising ammonia with an ammonia-lean liquid sorbent resulting in the reversible transfer of at least a portion of the ammonia from the ammonia-rich gas to the ammonia-lean liquid sorbent, thereby forming an ammonia-rich liquid sorbent and an ammonia-lean gas and, in a second zone, removing at least a portion of the ammonia from the ammonia-rich liquid sorbent to form gaseous ammonia and regenerate the ammonia-lean liquid sorbent.

21 Claims, 17 Drawing Sheets

(56) References Cited

U.S. PATENT DOCUMENTS

2023/0211280 A1* 7/2023 Temple .............. B01D 53/1493 71/27

OTHER PUBLICATIONS

Glasser, L., "Correct Use of Helmholtz and Gibbs Function Differences, A and G: The van't Hoff Reaction Box", American Chemical Society Publication, 2016, vol. 93, pp. 978-980.

Huang et al., "Tuning ionic liquids for high gas solubility and reversible gas sorption", Journal of Molecular Catalysis A: Chemical, 2008, vol. 279, pp. 170-176.

Itai et al., "Strong-Acid-Templated Construction of a Metallosupramolecular Architecture: Reversible Ammonia Adsorption in Aqueous Media in a Single-Crystal-to-Single-Crystal Conversion Manner", American Chemical Society Publications, 2017, vol. 17, pp. 949-953.

Iwata et al., "Reaction kinetics of ammonia absorption/desorption of metal salts", Applied Thermal Engineering, 2014, vol. 72, pp. 244-249.

Kale et al., "Optimizing Ammonia Separation via Reactive Absorption for Sustainable Ammonia Synthesis, ACS Applied Energy Materials", 2020, vol. 3, pp. 2576-2584.

Kohl et al., "Removal and Use of Ammonia in Gas Purification", Semantic Scholar, 1997, Chapter 4, pp. 278-329.

Lemus et al., "Ammonia capture from the gas phase by encapsulated ionic liquids (ENILs)", Royal Society of Chemistry, 2016, vol. 6, pp. 61650-61660.

Lv et al., "Ambient Ammonia Electrosynthesis Current Status, Challenges, and Perspectives", ChemSusChem, 2020, vol. 13, pp. 3061-3078.

Ma et al., "Highly efficient and selective separation of ammonia by deep eutectic solvents through cooperative acid-base and strong hydrogen-bond interaction", Journal of Molecular Liquids, 2021, vol. 337, 9 pages.

Malmali et al., "Ammonia Synthesis at Reduced Pressure via Reactive Separation", American Chemical Society Publications, 2016, vol. 55, pp. 8922-8932.

Malmali et al., "Better Absorbents for Ammonia Separation", ACS Sustainablle Chemistry and Engineering, 2018, vol. 6, pp. 6536-6546.

Mohamed et al., "Computational Exploration of Adsorption Enhanced Haber-Bosch using MOFs and Ionic Liquid/MOFs", Computer Aided Chemical Engineering, 2021, vol. 50, pp. 373-379.

Musgrave III et al., "Reduction of N2 to Ammonia by Phosphate Molten Salt and Li Electrode: Proof of Concept Using Quantum Mechanics" The Journal of Physical Chemistry Letters, 2021, vol. 12, pp. 1696-1701.

Pagsberg et al., "Kinetics and thermochemistry of the reversible gas phase reaction HONO+NH3=H,N-HONO studied by infrared diode laser spectroscopy", Chemical Physics Letters, Sep. 1994, vol. 227, pp. 6-17.

Payls et al., "Comparative Technoeconomic Analysis of Absorbent-Enhanced and Traditional Ammonia Production", Ammonia Energy Conference , Nov. 2019, 35 pages.

Palys et al., "Modeling and Optimal Design of Absorbent Enhanced Ammonia Synthesis", Processes, vol. 6, Issue 91, Jul. 2018, 17 pages.

Qui et al., "Regulated Threshold Pressure of Reversibly Sigmoidal NH3 Absorption Isotherm with Ionic Liquids", ACS Sustainable Chemistry and Engineering, 2020, vol. 8, pp. 1637-1643.

Rafiqul et al., "Energy efficiency improvements in ammonia production—perspectives and uncertainties", Energy, Oct. 2005, vol. 30, Issue 13, pp. 2487-2504.

Rieth et al., "High and Reversible Ammonia Uptake in Mesoporous AzolateMetal-Organic Frameworks with Open Mn, Co, and Ni Sites", Journal of the American Chemical Society, Jul. 2016, vol. 138, pp. 9401-9404.

Schiffer et al., "Electrification and Decarbonization of the Chemical Industry", Joule, Sep. 2017, vol. 1, pp. 10-14.

Scott et al., "Vapor pressure of ammonium sulfates", Atmospheric Environment (1967), 1979, vol. 13, Issue 2, pp. 307-317.

Setzler et al., "Advanced Alkaline Membrane H2/Air Fuel Cell System with Novel Technique for Air CO2 Removal", Chemical & Biomolecular Engineering, University of Delaware, Apr. 2019, 1 page.

Smith et al., "Current and future role of Haber-Bosch ammonia in a carbon-free energy landscape", Royal Society of Chemistry, 2020, vol. 13, pp. 331-344.

Smith et al., "Exceeding Single-Pass Equilibrium with Integrated Absorption Separation for Ammonia Synthesis Using Renewable Energy—Redefining the Haber-Bosch Loop", Advanced Energy Materials, 2021, vol. 11, 12 pages.

Spatolisano et al., "Haber-Bosch process intensification: A first step towards small-scale distributed ammonia production", Chemical Engineering Research and Design, 2023, vol. 195, pp. 651-661.

St. Pierre, "PEMFC contaminant tolerance limit—Foreign cations in ionomers", International Journal of Hydrogen Energy, May 2011, vol. 36, Issue 9, pp. 5527-5535.

Wildfire et al., "Microwave-assisted ammonia synthesis over Ru/MgO catalysts at ambient pressure", Catalysis Today, Apr. 2021, vol. 365, pp. 103-110.

Zhang et al., "An Overview of Ammonia Separation by Ionic Liquids", Industrial and Engineering Chemistry Research, 2021, vol. 60, Issue 19, pp. 6908-6924.

Zong et al., "Highly efficient and reversible adsorption of ammonia by incorporation of deep eutectic solvents into silica gel and Al2O3", Royal Society of Chemistry, 2022, vol. 46, 8 pages.

* cited by examiner

| Dose | Initial P /bar | Final P /bar | ΔP$_{NH3}$ /bar | Δn$_{NH3}$ /mol | cumulative Δn$_{NH3}$ | Dose | Initial P /bar | Final P /bar | ΔP$_{NH3}$ /bar | Δn$_{NH3}$ /mol | cumulative Δn$_{NH3}$ |
|---|---|---|---|---|---|---|---|---|---|---|---|
| 1 | 3.83 | 1.00 | 2.83 | 0.007 | 0.007 | 25 | 3.83 | 1.30 | 2.53 | 0.006 | 0.134 |
| 2 | 3.83 | 2.01 | 1.82 | 0.005 | 0.012 | 26 | 3.83 | 1.72 | 2.11 | 0.005 | 0.139 |
| 3 | 3.83 | 1.44 | 2.39 | 0.006 | 0.018 | 27 | 3.83 | 1.96 | 1.87 | 0.005 | 0.144 |
| 4 | 3.83 | 0.61 | 3.21 | 0.008 | 0.026 | 28 | 3.83 | 1.38 | 2.45 | 0.006 | 0.150 |
| 5 | 3.83 | 1.63 | 2.20 | 0.005 | 0.031 | 29 | 3.83 | 2.06 | 1.77 | 0.004 | 0.155 |
| 6 | 3.83 | 1.25 | 2.58 | 0.006 | 0.038 | 30 | 3.83 | 2.01 | 1.82 | 0.005 | 0.159 |
| 7 | 3.83 | 2.23 | 1.60 | 0.004 | 0.042 | 31 | 3.83 | 1.88 | 1.95 | 0.005 | 0.164 |
| 8 | 3.83 | 1.14 | 2.68 | 0.007 | 0.048 | 32 | 3.83 | 1.63 | 2.20 | 0.005 | 0.170 |
| 9 | 3.83 | 2.33 | 1.50 | 0.004 | 0.052 | 33 | 3.83 | 2.49 | 1.33 | 0.003 | 0.173 |
| 10 | 3.83 | 1.33 | 2.50 | 0.006 | 0.058 | 34 | 3.83 | 1.98 | 1.85 | 0.005 | 0.177 |
| 11 | 3.83 | 1.82 | 2.01 | 0.005 | 0.063 | 35 | 3.83 | 1.80 | 2.03 | 0.005 | 0.183 |
| 12 | 3.83 | 1.21 | 2.62 | 0.007 | 0.070 | 36 | 3.83 | 2.62 | 1.20 | 0.003 | 0.186 |
| 13 | 3.83 | 1.92 | 1.91 | 0.005 | 0.075 | 37 | 3.83 | 2.57 | 1.26 | 0.003 | 0.189 |
| 14 | 3.83 | 1.54 | 2.29 | 0.006 | 0.080 | 38 | 3.83 | 1.91 | 1.92 | 0.005 | 0.193 |
| 15 | 3.83 | 2.83 | 1.00 | 0.002 | 0.083 | 39 | 3.83 | 2.33 | 1.50 | 0.004 | 0.197 |
| 16 | 3.83 | 1.39 | 2.44 | 0.006 | 0.089 | 40 | 3.83 | 2.66 | 1.17 | 0.003 | 0.200 |
| 17 | 3.83 | 2.44 | 1.39 | 0.003 | 0.092 | 41 | 3.83 | 1.94 | 1.88 | 0.005 | 0.205 |
| 18 | 3.83 | 1.94 | 1.89 | 0.005 | 0.097 | 42 | 3.83 | 2.57 | 1.26 | 0.003 | 0.208 |
| 19 | 3.83 | 2.76 | 1.07 | 0.003 | 0.100 | 43 | 3.83 | 2.68 | 1.15 | 0.003 | 0.211 |
| 20 | 3.83 | 1.21 | 2.62 | 0.007 | 0.106 | 44 | 3.83 | 3.32 | 0.51 | 0.001 | 0.212 |
| 21 | 3.83 | 2.20 | 1.63 | 0.004 | 0.110 | 45 | 3.83 | 3.60 | 0.23 | 0.001 | 0.213 |
| 22 | 3.83 | 1.73 | 2.10 | 0.005 | 0.116 | 46 | 3.83 | 3.51 | 0.32 | 0.001 | 0.214 |
| 23 | 3.83 | 1.68 | 2.15 | 0.005 | 0.121 | 47 | 3.83 | 3.70 | 0.13 | 0.000 | 0.214 |
| 24 | 3.83 | 1.07 | 2.76 | 0.007 | 0.128 | 48 | 3.83 | 3.58 | 0.25 | 0.001 | 0.214 |

Figure 11B

LIQUID SORBENT-ENHANCED AMMONIA PRODUCTION

CONTRACTUAL ORIGIN

This invention was made with government support under Contract No. DE-AC36-08GO28308 awarded by the Department of Energy. The government has certain rights in the invention.

CROSS-REFERENCE TO RELATED APPLICATIONS

This application claims priority from U.S. Provisional Patent Application No. 63/519,983 filed on Aug. 16, 2023, the contents of which are incorporated herein by reference in its entirety.

BACKGROUND

Nitrogen fixation is one of the most important industrial reactions of all time. It is literally required to feed nearly half the planet by making fertilizer and accounts for about 1-2% of human energy consumption. For a century, the Haber-Bosch process has used high pressure and temperature to overcome the kinetic and thermodynamic barriers of nitrogen fixation to form ammonia from hydrogen and nitrogen mixtures. However, the high pressures required add significant capital and operating costs to industrial synthesis processes. Thus, there remains a need for improved methods, reaction pathways, separation processes, and/or systems for performing nitrogen fixation that can, among other things, complete the process more cost effectively and energy efficiently.

SUMMARY

An aspect of the present disclosure is a method that includes, in a first zone, contacting an ammonia-rich gas comprising ammonia with an ammonia-lean liquid sorbent resulting in the reversible transfer of at least a portion of the ammonia from the ammonia-rich gas to the ammonia-lean liquid sorbent, thereby forming an ammonia-rich liquid sorbent and an ammonia-lean gas and, in a second zone, removing at least a portion of the ammonia from the ammonia-rich liquid sorbent to form gaseous ammonia and regenerate the ammonia-lean liquid sorbent. In some embodiments of the present disclosure, the regenerated ammonia-lean liquid sorbent may be cycled back to the first zone.

In some embodiments of the present disclosure, the first zone may be maintained at a first pressure, and the second zone may be maintained at a second pressure that is lower than the first pressure. In some embodiments of the present disclosure, the first pressure may be between 5 bar and 300 bar. In some embodiments of the present disclosure, the second pressure may be between 0 bar and 100 bar. In some embodiments of the present disclosure, the first zone may be maintained at a first temperature, and the second zone may be maintained at a second temperature that is lower than the first temperature. In some embodiments of the present disclosure, the first temperature may be between 100° C. and 600° C. In some embodiments of the present disclosure, the second temperature may be between 100° C. and 600° C.

In some embodiments of the present disclosure, the ammonia-lean liquid sorbent includes an acid (HA), the ammonia-rich liquid sorbent includes a complex of ammonia and the acid $((NH_4)A)$, the reversible transfer of ammonia is according to a reaction defined by $x\ HA + y\ NH_3 \leftrightarrow (NH_4)_y A_x$, where $x=1$, and $1 \leq y \leq 10$.

In some embodiments of the present disclosure, the ammonia-rich liquid sorbent may further include water in which the acid is present as at least one of a solute, a suspension, and/or a combination thereof. In some embodiments of the present disclosure, the acid may include a phosphoric acid. In some embodiments of the present disclosure, the phosphoric acid may include at least one of $H_3PO_4$, $(NH_4)H_2PO_4$, $CsH_2PO_4$, an alkyl phosphoric acid, a benzyl phosphoric acid, a perfluoroalkyl phosphoric acids, and/or a combination thereof.

In some embodiments of the present disclosure, the acid (HA) may include $H_3PO_4$, the complex may include $(NH_4)H_2PO_4$, and the reversible transfer of ammonia includes a reaction defined by $H_3PO_4 + NH_3 \leftrightarrow (NH_4)H_2PO_4$.

In some embodiments of the present disclosure, the reversible transfer of ammonia may further include a reaction defined by $(NH_4)H_2PO_4 + NH_3 \leftrightarrow (NH_4)_2HPO_4$, and the complex may further include $(NH_4)_2HPO_4$.

In some embodiments of the present disclosure, the acid (HA) may include HCl, the complex may include $(NH_4)Cl$, and the reversible transfer of ammonia may include a reaction defined by $HCl + NH_3 \leftrightarrow (NH_4)Cl$.

In some embodiments of the present disclosure, the acid may include at least one of citric acid, acetic acid, formic acid, and/or oxalic acid. In some embodiments of the present disclosure, at least one of the first zone or the second zone may be integrated into a single unit operation that includes an ammonia synthesis reactor. In some embodiments of the present disclosure, the first zone and the second zone may be integrated into a single unit operation that is physically separate from an ammonia synthesis reactor. In some embodiments of the present disclosure, the first zone may be positioned within a first contained volume that includes at least one of a vessel, a tank, a column, a shell, and/or a combination thereof.

An aspect of the present disclosure is a system that includes a contained volume that includes at least one of a vessel, a tank, a column, a shell, and/or a combination thereof, an ammonia synthesis portion positioned within the contained volume, and an ammonia recovery portion positioned within the contained volume, where ammonia is synthesized within the ammonia synthesis portion, ammonia is removed via the ammonia recovery portion, an $N_2/H_2$ stream is directed to the contained volume, an ammonia-lean liquid sorbent stream is directed to the contained volume, an ammonia-rich liquid sorbent stream is removed from the contained volume, and at least one of an ammonia stream that includes $H_2$ and $N_2$ and/or a pure ammonia stream are removed from the contained volume.

BRIEF DESCRIPTION OF DRAWINGS

Some embodiments are illustrated in referenced figures of the drawings. It is intended that the embodiments and figures disclosed herein are to be considered illustrative rather than limiting.

FIG. 11B illustrates a table of experimental data used to create the plot illustrated in FIG. 11A, according to some embodiments of the present disclosure.

REFERENCE NUMERALS

Figure 1:
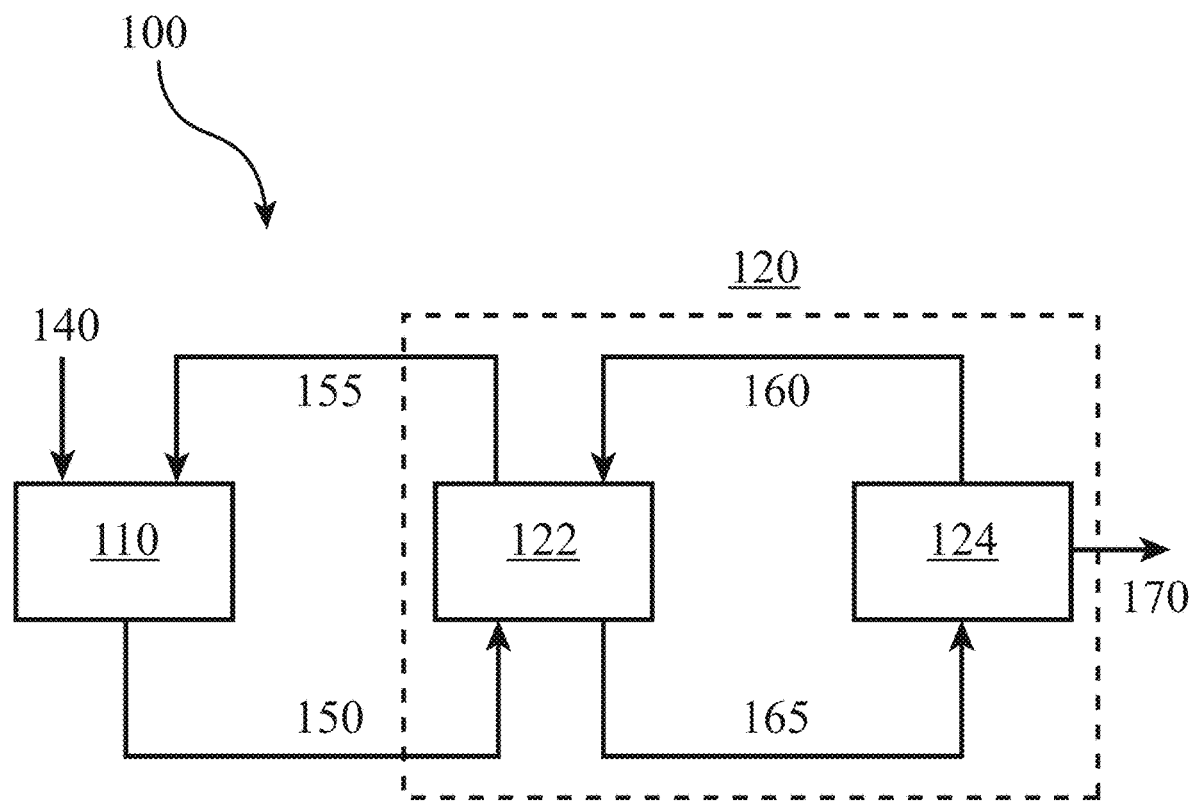
FIG. 1 and FIG. 2 illustrate systems for producing ammonia, according to some embodiments of the present disclosure.

100 . . . system
110 . . . reactor
120 . . . ammonia recovery system
122 . . . first zone
124 . . . second zone
140 . . . $N_2/H_2$ make-up stream
150 . . . ammonia-rich gas stream
155 . . . ammonia-lean gas stream
160 . . . ammonia-lean liquid sorbent stream
165 . . . ammonia-rich liquid sorbent stream
170 . . . ammonia stream
300 . . . method
310 . . . absorbing
320 . . . desorbing
330 . . . cycling
400 . . . ammonia synthesis/recovery system
410 . . . contained volume
420 . . . internal components
505 . . . packed bed reactor
530 . . . reactor stage
540 . . . interstage absorber/cooler
550 . . . cooling fluid
600 . . . tubes
610 . . . baffles
700 . . . loop reactor
710 . . . heat exchanger
720 . . . pump
800 . . . liquid distributor
810 . . . cooling jacket
812 . . . coolant inlet
814 . . . coolant outlet
820 . . . packing
900 . . . inlet slurry
910 . . . outlet slurry
920 . . . gas bubble
930 . . . suspended catalyst

DETAILED DESCRIPTION

The present disclosure relates to methods and/or systems that enable the continuous recovery of ammonia as it is produced via the Haber-Bosch process and/or other processes that produce ammonia. As described herein, in some embodiments of the present disclosure, a method and/or system for recovering ammonia may include a first step of contacting a gas stream containing ammonia and at least one of nitrogen and/or hydrogen with a liquid sorbent, such that the liquid sorbent physically and/or chemically absorbs the ammonia, removing it from the other components contained in the gas stream. The resultant ammonia-rich liquid sorbent may then be directed to a second step in which the ammonia is released (i.e., desorbed) from the liquid sorbent, resulting in the formation of a pure or relatively pure ammonia stream and the regeneration of an ammonia-lean or ammonia-free liquid sorbent, which may then be recycled back to the first step.

The inherent technical challenges of Haber-Bosch lie in the need to achieve meaningfully fast catalytic reaction rates via high reaction temperatures, which introduces severe thermodynamic penalties—thus also requiring high pressures to shift equilibrium in favor of the ammonia product as shown in Reaction 1.

$$N_2(g) + 3H_2(g) \leftrightarrow 2NH_3(g) \qquad \text{Reaction 1}$$

The low conversion-per-reactor-pass of hydrogen ($H_2$) and nitrogen ($N_2$) further necessitates enormous energy demands and staggering losses from $NH_3$ condensation recovery and from reactant recycle via mechanical recompression loops that span two orders of magnitude in pressure change independently accounting for up to 22% of total energy demands and nearly 60% of all energy losses in modern Haber-Bosch plants. Therefore, to address these significant problems, the present disclosure relates to novel liquid absorption of ammonia from synthesis mixtures as an energy-advantaged separation strategy for the Haber-Bosch process. To accomplish this, an acid-based chemistry is described herein that, in some embodiments, can be completed under near-reactor conditions for spontaneous $NH_3$ absorption by acid-containing liquid sorbents, for example phosphoric acid ($H_3PO_4$) (see Reaction 3A and 3B below).

Thus, among other things, the present disclosure relates to liquid-based sorbent chemistry and methods to improve both the performance and economics of the traditional Haber-Bosch process and/or other ammonia producing systems. As described herein, the process conditions of an improved ammonia production system and/or method may be manipulated to adjust the equilibrium of gaseous ammonia and ammonia contained as part of an ammonia-acid complex. In some embodiments of the present disclosure, the ammonia-acid complex may be contained within a liquid, e.g., water. Thus, as used herein, the term "liquid sorbent" refers to a liquid/soluble acid mixture and/or to a neat, high-boiling acid compound in the liquid state. The liquid sorbent may have a first state in which the acid is not complexed, or not measurably complexed, with ammonia. This first state is referred to herein as the desorbed state of the liquid sorbent. Further, the liquid sorbent may have a second state in which a measurable portion of the acid is complexed with ammonia, referred to herein as the absorbed state.

The first state and the second state, i.e., the desorbed state and absorbed state, may be viewed as optimum target states. However, they may also be viewed as endpoints on a continuum, where final steady-state concentration(s) of absorbed ammonia and/or free ammonia depend on the equilibrium resulting from the process conditions within the system. Thus, as described below in more detail, the first state, the desorbed state, may be attained while maintaining and/or subjecting the liquid sorbent and ammonia to a first set of process conditions (e.g., pressure ($P_1$) and/or temperature ($T_1$)), where the liquid sorbent is essentially free of the ammonia-acid complex (or at a relatively low concentration of the ammonia-acid complex) and the ammonia is contained within the liquid sorbent as free, unassociated ammonia gas, and the acid is mostly un-complexed with ammonia (or at a relatively low concentration of ammonia-acid complex). The second state, the absorbed state, may then be attained while maintaining and/or subjecting the liquid sorbent and ammonia to a second set of process conditions (e.g., pressure ($P_2$) and/or temperature ($T_2$)), where the ammonia is mostly present in the liquid sorbent in the form of the ammonia-acid complex (or at a relatively high concentration of ammonia-acid complex) and the presence of free gaseous ammonia is relatively low.

Figure 2:
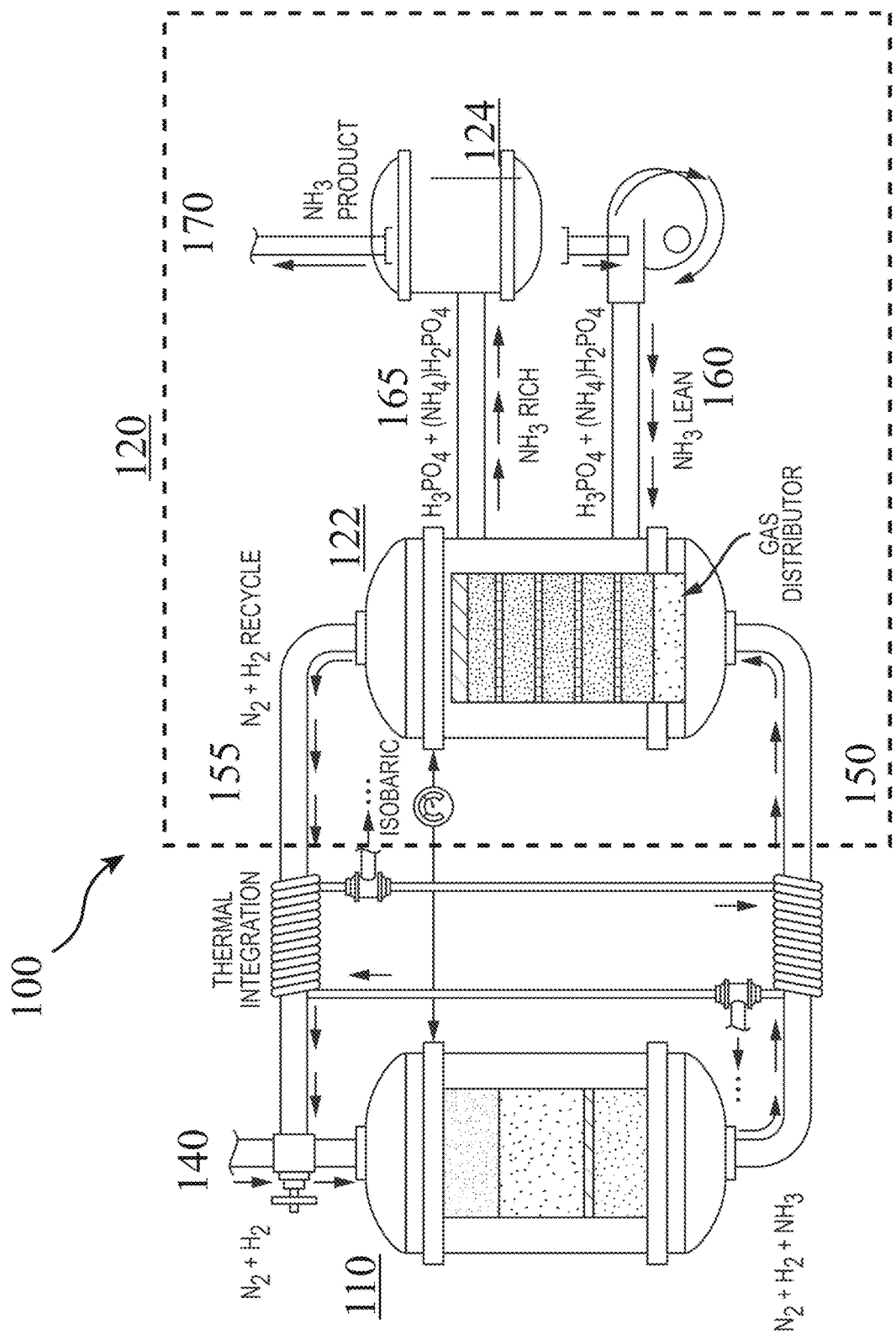

FIG. 1 and FIG. 2 illustrate systems 100 for producing ammonia, according to some embodiments of the present disclosure. FIG. 1 illustrates a simplified block flow-diagram of a system 100, while FIG. 2 illustrates a more detailed illustration of an exemplary system 100. Referring to FIG. 1, a system 100 may include an ammonia synthesis reactor 110, which may be configured to receive a nitrogen/hydrogen make-up stream 140 ($N_2/H_2$ make-up stream) and an ammonia-lean gas stream 155, which may be recycled from an ammonia recovery system 120 (dashed box), according to some embodiments of the present disclosure. As shown in FIG. 2, an ammonia synthesis reactor 110 may include a packed bed reactor containing a catalyst designed for converting hydrogen and nitrogen to ammonia.

As shown in FIG. 1 and FIG. 2, an $N_2/H_2$ make-up stream 140 and an ammonia-lean gas stream 155 may be directed separately to an ammonia synthesis reactor 110 (e.g., each via an independent feed nozzle to the reactor) or the two streams may be combined and then fed as a mixture through a single nozzle to an ammonia synthesis reactor 110. Once in the ammonia synthesis reactor 110, the hydrogen and nitrogen mix and/or continue to mix, contact the catalyst, and react to form ammonia. The ammonia and any unreacted hydrogen and/or nitrogen then exit the ammonia synthesis reactor 110 in a mixture referred to herein as an ammonia-rich gas stream 150.

Referring again to FIG. 1, an ammonia recovery system 120 may include a first zone 122 and a second zone 124, wherein each zone is a contained volume such as a vessel, a tank, and/or a column configured to receive the various liquid/gas streams needed to remove the ammonia from ammonia-rich gas steam. The first zone 122 of an ammonia recovery system 120 is configured to contact the ammonia-rich gas stream 150 with an ammonia-lean liquid sorbent stream 160 to enable the absorption of ammonia into the liquid sorbent to form an ammonia-rich liquid sorbent stream 165 and the ammonia-lean gas stream 155, which may then be recycled back to the ammonia synthesis reactor 110 to be reacted further in the reactor 110. The second zone 124 of an ammonia recovery system 120 is configured to enable the desorption of ammonia from the liquid sorbent to produce a "product" ammonia stream 170, which can then leave the ammonia recovery system 120 and/or the system 100. In some embodiments of the present disclosure, an ammonia stream 170 may be up to 99.5 wt % pure ammonia. This may be achieved, at least in part, by reducing the operating pressure and/or operating temperature of the second zone 124 relative to the ammonia synthesis reactor 110 and/or the first zone 122. This results in the formation of the ammonia stream 170 and the regeneration of the ammonia-lean liquid sorbent stream 160, which may then be recycled back to the first zone 122 where the absorption/desorption cycle may be started again.

In some embodiments of the present disclosure, a first zone 122 (e.g., a vessel) may be operated at a temperature between about 100° C. and about 600° C. and at a pressure between about 5 bar and about 300 bar. In some embodiments of the present disclosure, a second zone 124 may be operated at a temperature between about 100° C. and about 600° C. and at a pressure between about 0 bar and about 100 bar. In some embodiments of the present disclosure, the operating conditions of the first zone 122 may be comparable to those of the ammonia synthesis reactor 110, resulting in minimal temperature and pressure swings to integrate the reactor 110 with the recovery system 120, and that significant energy and cost savings may be enabled via ammonia recovery by system 120 compared to traditional Haber-Bosch ammonia separation systems, which usually involve significant decompression of reactor exit streams to condense ammonia product and thus recompression of unreacted reactant gases for recycle to the reactor inlet. The favorable operating conditions and process advantages of system 120 may be enabled at least partially by the incompressible nature of the liquid sorbent streams 160 and 165, which can reduce the major mechanical recompression demands of traditional ammonia separation techniques (e.g., low-pressure condensation).

The contacting of an ammonia-rich gas stream 150 with an ammonia-lean liquid sorbent stream 160 in the first zone 122 (e.g., a vessel) may result in the transfer of at least a portion of the gaseous ammonia into the liquid sorbent followed by at least a portion of the ammonia complexing with an acid present as either a solute in the liquid or as a neat, high-boiling acid compound in a liquid phase, resulting in the forming of an ammonia-acid complex. The contacting of the ammonia-rich gas stream 150 with an ammonia-lean liquid sorbent stream 160 in the first zone 122 results in the liquid sorbent reaching or approaching the second state (as described above), in which a measurable portion of the acid is complexed with ammonia. Recall, the liquid sorbent has two end-states, an absorbed state and a desorbed state. The second state, the absorbed state, is achieved in the first zone 122 of the ammonia recovery system 120, and the first state, the desorbed state, is achieved in the second zone 124 of the ammonia recovery system 120. In the second zone 124 (e.g., a vessel), at least a portion of the ammonia contained in the ammonia-acid complex is released, resulting in free ammonia gas, as ammonia stream 170, and the regeneration of the acid, substantially free of ammonia (or as $(NH_4)H_2PO_4$ referring to Reactions 3A and 3B below), as ammonia-lean liquid sorbent stream 160.

As described herein, the removal of ammonia from an ammonia-rich gas stream utilizes the reversible absorption/desorption of a liquid sorbent, where the liquid sorbent includes an acid present as either a solute in the liquid (e.g., water) or as a neat, high-boiling acid compound in a liquid phase, with the acid capable of reversibly forming a complex with ammonia. This reversible reaction is generalized in Reaction 2 below:

$$x\, HA + y\, NH_3 \leftrightarrow (NH_4)_y A_x \qquad \text{Reaction 2}$$

HA represents an acid, $(NH_4)_y A_x$ represents the ammonia-acid complex and x and y denote stoichiometric coefficients. In some embodiments of the present disclosure, an acid (HA) utilized in the systems and methods described above may include at least one of $H_3PO_4$, $(NH_4)H_2PO_4$, $CsH_2PO_4$, $HBF_4$, $HSO_3CF_3$, $H_3PMo_{12}O_{40} \cdot mH_2O$, $H_3PW_{12}O_{40} \cdot nH_2O$, $H_4SiW_{12}O_{40} \cdot pH_2O$, HCl, $H_2SO_4$, $(NH_4)HSO_4$, and/or $HNO_3$ having corresponding ammonia-acid complexes of at least one of $(NH_4)H_2PO_4$, $(NH_4)_2HPO_4$, $(NH_4)CsHPO_4$, $(NH_4)BF_4$, $(NH_4)SO_3CF_3$, $(NH_4)_3PMo_{12}O_{40} \cdot mH_2O$, $(NH_4)_3PW_{12}O_{40} \cdot nH_2O$, $(NH_4)_4SiW_{12}O_{40} \cdot pH_2O$, $(NH_4)Cl$, $(NH_4)HSO_4$, $(NH_4)_2SO_4$, and/or $(NH_4)NO_3$, respectively, where m is about 12, n is between about 6 and about 24, and p is between about 6 and about 29. Reactions for each are shown in order below (Reactions 3A-11). Other possible phosphoric acids include at least one of alkyl phosphoric acids, benzyl phosphoric acids, perfluoroalkyl phosphoric acids. Other acids that may be used include citric acid, acetic acid, formic acid, and/or oxalic acid.

$$H_3PO_4 + NH_3 \leftrightarrow (NH_4)H_2PO_4 \qquad \text{Reaction 3A}$$

$$(NH_4)H_2PO_4 + NH_3 \leftrightarrow (NH_4)_2HPO_4 \qquad \text{Reaction 3B}$$

$$CsH_2PO_4 + NH_3 \leftrightarrow (NH_4)CsHPO_4 \qquad \text{Reaction 3C}$$

$$HB_xF_y + NH_3 \leftrightarrow (NH_4)B_xF_y\, (1 \le x \le 20; 4 \le y \le 42) \qquad \text{Reaction 4}$$

$$HSO_3C_xF_y + NH_3 \leftrightarrow (NH_4)SO_3C_xF_y\, (1 \le x \le 10; 3 \le y \le 21) \qquad \text{Reaction 5}$$

$$H_3PMo_{11}O_{40} \cdot mH_2O + 3NH_3 \leftrightarrow (NH_4)_3PMo_{12}O_{40} \cdot mH_2O \qquad \text{Reaction 6}$$

$$H_3PW_{12}O_{40} \cdot nH_2O + 3NH_3 \leftrightarrow (NH_4)_3PW_{12}O_{40} \cdot nH_2O \qquad \text{Reaction 7}$$

$$H_4SiW_{12}O_{40} \cdot pH_2O + 4NH_3 \leftrightarrow (NH_4)_4SiW_{12}O_{40} \cdot pH_2O \qquad \text{Reaction 8}$$

$$HCl + NH_3 \leftrightarrow (NH_4)Cl \qquad \text{Reaction 9}$$

$$H_2SO_4 + NH_3 \leftrightarrow (NH_4)HSO_4 \qquad \text{Reaction 10A}$$

$$(NH_4)HSO_4 + NH_3 \leftrightarrow (NH_4)_2SO_4 \qquad \text{Reaction 10B}$$

$$HNO_3 + NH_3 \leftrightarrow (NH_4)NO_3 \qquad \text{Reaction 11}$$

Another class of compounds that may be used as a liquid sorbent may be characterized as having the composition $R_1-SO_2-NH-SO_2-R_2$, where $R_1$ and $R_2$ may have different structures or may have the same structure, further defined by the structure $C_xH_y$, where x is between 1 and 6, inclusively, and y is between 3 and 13, inclusively.

Referring again to FIG. 2, a first zone 122 for contacting an ammonia-rich gas stream 150 with an ammonia-lean liquid sorbent stream 160 so that absorption of ammonia into the liquid sorbent may be performed in a "bottom-up" vessel, where both the gas stream and the liquid stream flow in parallel from the "bottom" of the vessel and exit at or near the top of the vessel. However, this is for illustrative purposes only, and other configurations fall within the scope of the present disclosure. Also shown in FIG. 2, a vessel configured as a first zone 122 may include one or more gas distributor components designed to ensure high interfacial surface areas of the gas bubbles resulting from the combination of an ammonia-rich gas stream 150 with an ammonia-lean liquid sorbent stream 160. Examples of gas distributor components include, but are not limited to, static spargers such as dip tubes, perforated plates, perforated rings and porous plates and dynamic spargers such as non-compressing nozzles (e.g., two-phase jets with and without momentum transfer tubes) and compressing nozzles (e.g., ejectors, ejector jet nozzles and venturi nozzles). However, these examples are for illustrative purposes only, and other gas distributor components designed to introduce an ammonia-rich gas stream 150 into a first zone 122 (e.g. a vessel) fall within the scope of the present disclosure.

Referring again to FIG. 2, a first zone 122 of an ammonia recovery system 120 for absorbing ammonia may be positioned within a vessel such as a column or tank (separate from the ammonia synthesis reactor 100). Such a vessel may include one or more internal components designed to promote the contacting and/or to attenuate back-mixing of the ammonia-rich gas stream 150 with the ammonia-lean liquid sorbent stream 160. Examples of internal components include, but are not limited to, baffles, trays, chemically inert packings, static mixers, impellers and/or subdivided vertical shafts. However, these examples are for illustrative purposes only, and other internal components to promote contacting of ammonia-rich gas stream 150 and ammonia-lean liquid sorbent stream 160 fall within the scope of the present disclosure. In some embodiments of the present disclosure, such a system may also include an external and/or internally integrated heat exchanger (recycle loops not illustrated).

Referring again to FIG. 2, a second zone 124 of an ammonia recovery system 120 for desorbing ammonia may be positioned within a vessel such as a column or tank (separate from the ammonia synthesis reactor 100). In some embodiments of the present disclosure, a second zone 124 may be positioned in a separate and distinct vessel from a vessel containing the first zone 122. In some embodiments of the present disclosure, a single a second zone 124 may be positioned in a separate and distinct vessel from the vessel containing the first zone 122. In some embodiments of the present disclosure, a single vessel may be configured to contain both a first zone and a second zone 124. In some embodiments of the present disclosure, a vessel for ammonia recovery may be performed in a vessel configured for "top-down" flow, where the ammonia-rich liquid sorbent stream 165 is fed to the "top" of the vessel and then flows by gravity to the bottom of the vessel. This configuration for a second zone 124 may be preferred to enable easier separation of ammonia gas from the liquid sorbent and to ensure that this step occurs at a low pressures zone in the vessel, rather than in a zone having a large hydrostatic head. The ammonia-lean liquid sorbent stream 160 leaving the bottom of the second zone 124 may then by transported by a pump back to the first zone 122, for bottom-up flow through the first zone 122, as described before. However, as with the first zone 122, the configuration of the various elements shown in FIG. 2 are for exemplary purposes, and other configurations fall within the scope of the present disclosure.

Further, although FIG. 1 and FIG. 2 illustrate each of the ammonia synthesis reactor 110, the first zone 122, and the second zone 124 as physically separated and individual unit operations, two or more of these unit operations may be combined into a single unit operation, e.g., an ammonia synthesis/recovery system, which is described in more detail below. Thus, in some embodiments of the present disclosure, an ammonia synthesis reactor 110 may be integrated with at least one of a first zone 122 and/or a second zone 124 into a single unit operation. Similarly, in some embodiments of the present disclosure, a first zone 122 and a second zone 124 may be integrated into a single unit operation. Specific examples are provided below.

In some embodiments of the present disclosure, a vessel configured as a second zone 124 may include one or more gas/liquid distributor components designed to ensure high interfacial surface areas of the gas bubbles resulting from the release of ammonia from an ammonia-rich liquid sorbent 165 to form an ammonia-lean liquid sorbent 160 and an ammonia stream 170 containing the released ammonia. Examples of gas/liquid distributor components include, but are not limited to, static spargers such as dip tubes, perforated plates, perforated rings and porous plates and dynamic spargers such as non-compressing nozzles (e.g., two-phase jets with and without momentum transfer tubes) and compressing nozzles (e.g., ejectors, ejector jet nozzles and venturi nozzles). However, these examples are for illustrative purposes only, and other gas distributor components designed to introduce an ammonia-rich liquid sorbent 165 into a second zone 124 fall within the scope of the present disclosure.

Referring again to FIG. 2, a second zone 124 of an ammonia recovery system 120 for absorbing ammonia may be positioned within a vessel such as a column or tank (separate from the ammonia synthesis reactor 100). Such a vessel may include one or more internal components designed to promote the contacting and/or to attenuate back-mixing of the ammonia-rich liquid sorbent 165 to promote the release of ammonia to form the ammonia-lean liquid sorbent 160 and the ammonia stream 170 containing the released ammonia. Examples of internal components include, but are not limited to, baffles, trays, chemically inert packings, static mixers, impellers and/or subdivided vertical shafts. However, these examples are for illustrative purposes only, and other internal components for use in the second zone 124 of an ammonia recovery system 120 fall within the scope of the present disclosure. In some embodiments of the present disclosure, such a system may also include an external and/or internally integrated heat exchanger (recycle loops not illustrated).

Figure 3:
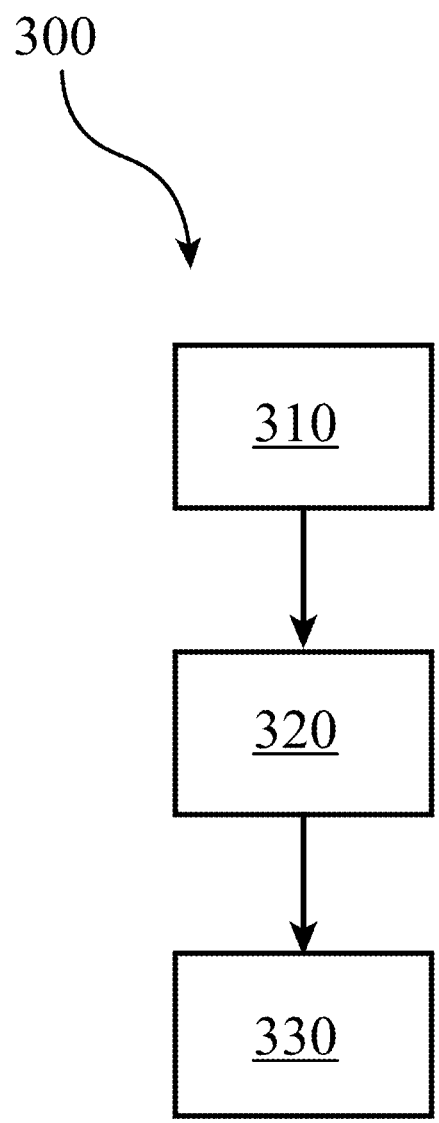
FIG. 3 illustrates a method for producing ammonia, according to some embodiments of the present disclosure.

FIG. 3 simplifies the systems illustrated in FIG. 1 and FIG. 2 by illustrating a method 300 for producing ammonia, according to some embodiments of the present disclosure. Much of the details of such a method 300 are described above. In summary, a method for recovering ammonia from a reactor may include an absorbing 310 step, where an ammonia-rich gas stream 150 exiting an ammonia synthesis reactor 110 is contacted with an ammonia-lean liquid sorbent stream 160, resulting in the forming of an ammonia-rich liquid sorbent stream 165 and an ammonia-lean gas stream (i.e., absorption). The ammonia-rich liquid sorbent stream 165 may then be directed to a desorbing 320 step, where the ammonia-rich liquid sorbent stream 165 is subjected to operating conditions which promote the release (i.e., desorption) of at least a portion of the ammonia contained in the ammonia-rich liquid sorbent stream 165. The desorbing 320 step results in the regeneration of the ammonia-lean liquid sorbent stream 160 and an ammonia product stream 170. The ammonia-lean liquid sorbent stream 160 may then be recycled back to the ammonia synthesis reactor 110 (as shown in FIG. 1 and FIG. 2) in a cycling 330 step, enabling the cycle to be repeated continuously for as many cycles as possible, with possible limitations including catalyst deactivation, fouling and/or corrosion.

The reaction is exothermic, so as shown in FIG. 2, in some embodiments of the present disclosure, heat integration, using a suitable heat exchanger, may be provided to transfer heat from the ammonia-rich gas stream 150 to the relatively cool ammonia-lean gas stream 155. In some embodiments of the present disclosure, such suitable heat exchangers may also be integrated inside of an ammonia synthesis reactor 110 to recover exothermic reaction heat for use elsewhere in the reactor 110 and/or in the system 100. Other heat exchange networks and utilities (not illustrated in FIG. 2 and FIG. 3) may exist outside of the boundaries of system 100 that may contribute to physical conditions (e.g., temperature of stream 140) relevant to some embodiments of the present disclosure.

For the case of a traditional Haber-Bosch process, an ammonia-rich gas stream 150 exiting an ammonia synthesis reactor 110 may have a temperature between about 400° C. and about 600° C. and a pressure between about 100 bar and about 300 bar. For the case of non-Haber-Bosch processes, such as those involving electrochemical and/or microwave reactors, an ammonia-rich gas stream 150 exiting an ammonia synthesis reactor may have a temperature between about 20° C. and 300° C. Further, for the case of a traditional Haber-Bosch process, an ammonia-lean gas recycle stream, equivalent to the ammonia-lean gas stream 155 shown in FIG. 1 and FIG. 2 may have a temperature between about 300° C. and about 450° C. and at a pressure between about 100 bar and about 300 bar. Again, for the case of a traditional Haber-Bosch process, a $N_2/H_2$ make-up stream 140 may have a temperature between about 300° C. and about 450° C. and at a pressure between about 100 bar and about 300 bar. However, as described herein, some of the advantages provided by some embodiments of ammonia recovery systems 120 described herein include reducing at least one of the necessary operating pressures, operating pressure differentials, operating temperatures, operating temperature differentials and/or mechanical work requirements (e.g., compression energy) of or surrounding at least one of the ammonia synthesis reactor 110, the ammonia recovery system 120 and/or streams associated with the reactor 110 and/or the ammonia recovery system 120; e.g., the ammonia-rich gas stream 150 and/or the ammonia-lean gas recycle stream 155.

Figure 4:
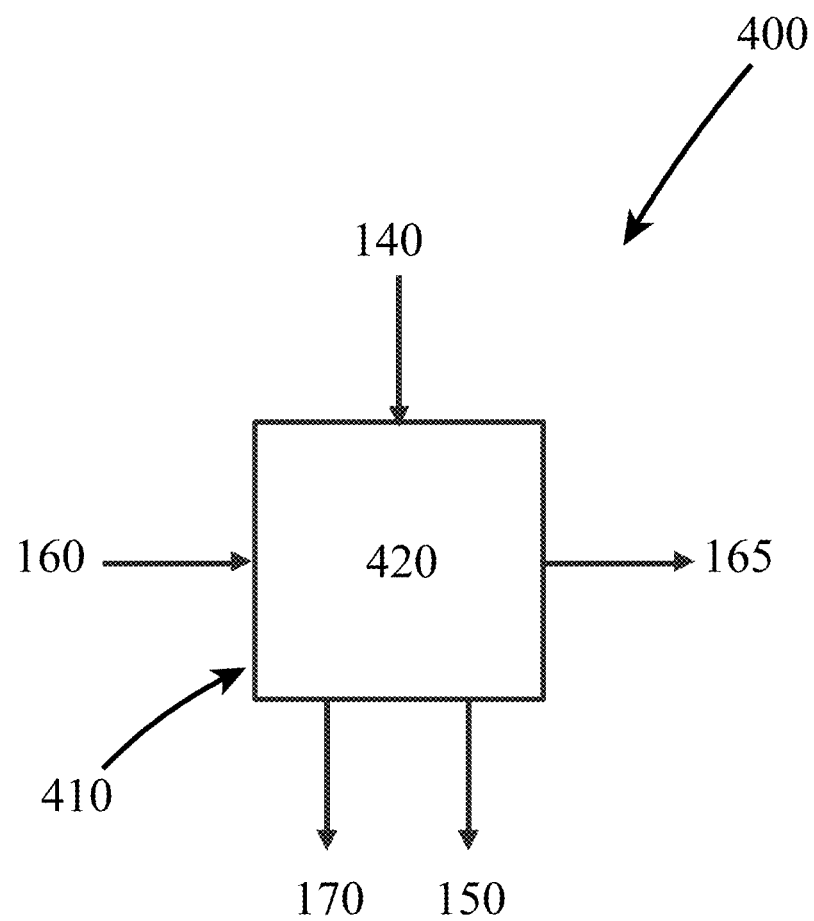
FIGS. 4-9 illustrate various systems for producing ammonia, where the equipment for accomplishing the removal of ammonia via a liquid phase is combined with the reactor converting a gas phase (hydrogen and nitrogen) to the ammonia, according to some embodiments of the present disclosure.

FIGS. 4-9 illustrate various exemplary systems for producing ammonia, where the equipment for accomplishing the removal of ammonia via a liquid phase is combined with the ammonia synthesis reactor 110 converting hydrogen ($H_2$) and nitrogen ($N_2$) to the ammonia, according to some embodiments of the present disclosure. Such combined ammonia synthesis reactor 110 and ammonia recovery system 120 are referred to herein as ammonia synthesis/recovery systems 400. FIG. 4 illustrates the generalized concepts that are common in each of the exemplary ammonia synthesis/recovery systems 400 illustrated in FIGS. 5-9 and described below. Briefly, an ammonia synthesis/recovery system 400 combines the first zone 122 of an ammonia recovery system 120 with the features needed for ammonia synthesis (e.g., see the ammonia synthesis reactor 110 in FIGS. 1 and 2). Thus, an ammonia synthesis/recovery system 400 includes a contained volume 410, for example at least one of a tank, vessel, column, and/or shell. The components needed to synthesize the ammonia are then either directed to the contained volume and/or placed in the contained volume, these components being an $N_2/H_2$ feed stream 410 and a catalyst to catalyze ammonia synthesis. The catalyst may be positioned stationary in the contained volume 410 or it may be co-fed with one or more of the streams fed to the contained volume 410. Then, to complete the ammonia capture and recovery, an ammonia-lean liquid sorbent stream 160 may be directed to the contained volume. As shown below, an ammonia synthesis/recovery system 400 may generate at least one of a pure ammonia stream 170 and/or an ammonia-rich gas stream 150. The ammonia absorption may be facilitated by the inclusion of some kind of internal component that facilitates liquid/gas contacting. Similarly, a contained volume may also contain some kind of internal component to facilitate gas/liquid separation to enable the generation of an ammonia-rich liquid sorbent stream 165, which exits the contained volume. Internal components and/or stationary catalyst are referred to collectively as internal components 420. These concepts are expounded upon in the five exemplary ammonia synthesis/recovery systems 400 described below.

Figure 5:
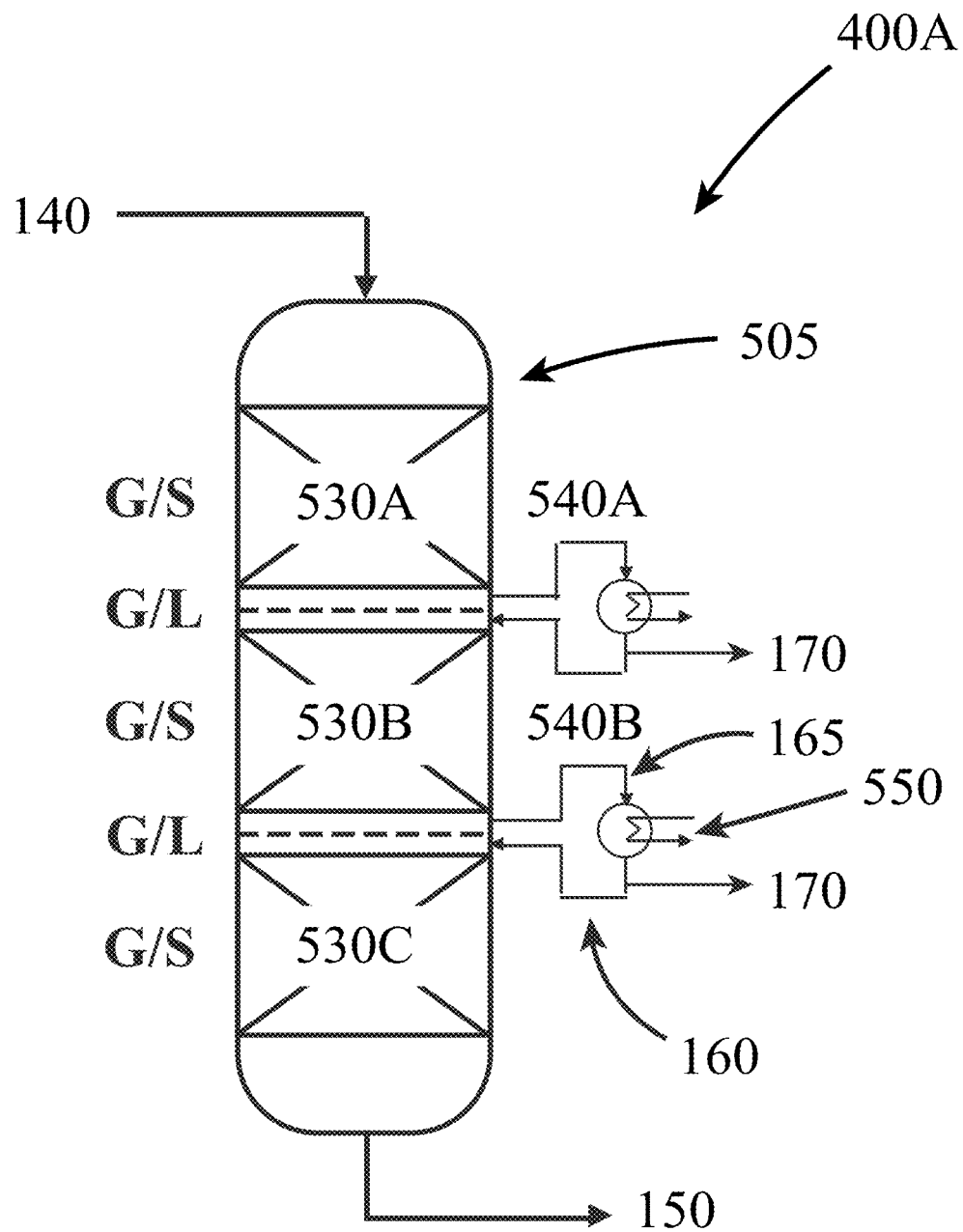

FIG. 5 illustrates a first example of an ammonia synthesis/recovery system 400A that includes a packed bed reactor 505 (i.e., the contained volume 410) and interstage absorber/coolers 540 utilizing liquid sorbent as both a cooling fluid and a sorbent. This example is designed as an adiabatic gas/solid (G/S) (L refers to liquid phase) reactor configured with interstage absorption/cooling for combined $NH_3$ removal and reaction exotherm management, according to some embodiments of the present disclosure. This exemplary system 400A for producing and recovering ammonia divides a packed bed reactor 405 into a series of smaller adiabatic beds, i.e., reactor stages 530, with interstage absorber/coolers 540 positioned between reactor stages 430 (recycle loops not shown). In some embodiments of the present disclosure, relatively cold (e.g., 100-250° C.), ammonia free (or ammonia-lean) liquid sorbent may be introduced into the packed bed reactor 510 between reactor stages 530, where the liquid sorbent may act as a reactive heat transfer fluid to (i) cool interstage product gases, (ii) strip ammonia from the gas stream, (iii) recover heat generated by the exothermic reaction, and (iv) release a relatively pure ammonia stream (170A) after the liquid sorbent stream is cooled.

In this example, the ammonia synthesis/recovery system 400A includes three reactor stages (530A, 530B, and 530C), although fewer or more reactor stages may be utilized. Two interstage absorber/coolers (540A and 540B) are also shown, with a first interstage absorber/cooler 540A positioned between a top reactor stage 530A and a middle reactor stage 530B, with a second interstage absorber/cooler 540B positioned between the middle reactor stage 530B and the bottom reactor stage 530C. Each interstage absorber/cooler 540 may be configured with a recirculating liquid sorbent loop, where the ammonia-lean liquid sorbent stream 160 is directed between reactor stages 530, acting as both a coolant and a sorbent. Subsequently, the heated ammonia-rich liquid sorbent stream 165 exits the packed bed reactor 505 and is directed to a heat exchanger positioned within the interstage absorber/cooler, where the heated ammonia-rich liquid sorbent stream 165 is cooled using a cooling fluid 550, releasing an ammonia product stream 170, and resulting in the regeneration of the ammonia-lean liquid sorbent stream 160. So, in this exemplary ammonia synthesis/recovery system 400A, the packed bed reactor 505 acts as the ammonia synthesis reactor 110 and the first zone 122 of an ammonia recovery system 120 and the interstage absorber/coolers 540A and 540B as the second zone 124 of an ammonia recovery system 120. An additional ammonia-containing stream 150 exits the bottom of the packed bed reactor 505. This ammonia stream 150 may then be directed to an ammonia recovery unit that also utilizes the liquid sorbent (in a first zone 122, not shown) to separate the ammonia from the $N_2$ and the $H_2$.

External heat exchangers with coolant coils may be positioned between reactor stages, and/or interstage direct injection of a cold fluid, e.g., $H_2/N_2$ makeup, may be used. In some embodiment of the present disclosure, such a system may utilize a gas distributor plate (e.g., porous carbon) and/or inert packings like those used in distillation columns (e.g., Raschig rings) to increase the gas/liquid (G/L) contact surface area. G/S refers to gas/solid areas packed with catalyst. Referring again to FIG. 5, the packed bed reactor 505 may be operated in a "top-down" manner, where the gas stream flows down after entering the "top" of the reactor and exits at or near the bottom of the reactor. However, this is for illustrative purposes only, and other configurations fall within the scope of the present disclosure.

Figure 6:
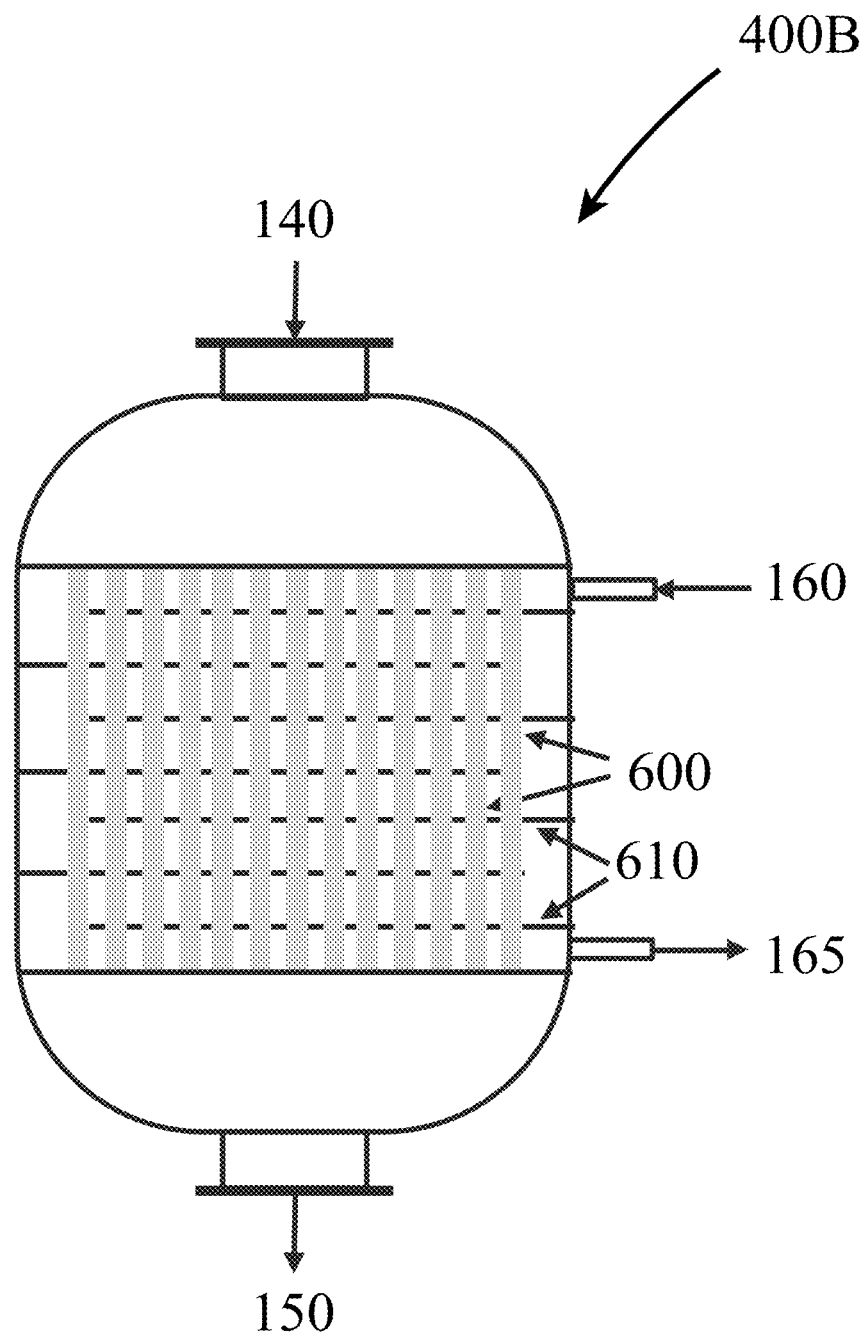

FIG. 6 illustrates a second example of an ammonia synthesis/recovery system 400B, configured as a polytropic shell/tube reactor (G/S) with integrated $NH_3$ absorption/cooling, according to some embodiments of the present disclosure. This is a shell/tube design where reactant mixture, i.e., the $N_2/H_2$ feed stream 140 is "tube-side" and directed through catalyst-packed, gas-permeable tubes 600. The liquid sorbent flows around baffles 610 on the "shell-side" and acts as both a heat transfer media and an ammonia sorbent. As the ammonia is produced, it is transferred through the gas permeable walls of the tubes 600 into the liquid sorbent flowing through the "shell-side" of the system 400B. This example shows the ammonia-lean liquid sorbent stream 160 flowing in a top-down configuration (recycle loops not illustrated), with the ammonia-rich liquid sorbent stream 165 exiting at the low point of the system 400B. This ammonia-rich liquid sorbent stream 165 is then directed to an ammonia desorption unit operation (i.e., zone 2) to release the complexed ammonia, as described above (not shown here). Thus, for this exemplary ammonia synthesis/recovery system 400B, the polytropic shell/tube reactor acts as the ammonia synthesis reactor 110 and the first zone 122 of an ammonia recovery system. The ammonia-rich liquid sorbent stream 165 is then directed to a separate vessel containing the second zone 124 of the ammonia recovery system to generate the final pure ammonia stream 170. Additional ammonia and unreacted $H_2$ and/or $N_2$ exit the bottom of the reactor as an ammonia-rich gas stream 150. This ammonia stream 150 may then be directed to an ammonia recovery unit that also utilizes the liquid sorbent (in a first zone 122, not shown) to separate the ammonia from the $N_2$ and the $H_2$.

FIG. 6 illustrates a top-down configuration for the gas flow through the ammonia synthesis/recovery system 400B. However, this top-down rendering is for illustrative purposes only, and other configurations fall within the scope of the present disclosure. For example, parallel or cross-flow patterns are also possible, depending on the baffle design. Cross-flow generally provides higher heat transfer coefficients. For ammonia production as described herein, tubes 600 may be made of a high pressure-stable, gas-permeable material (e.g., hollow carbon fiber) to allow for product gas (ammonia) penetration, while minimizing and/or prevent the transfer of liquid sorbent. Liquid sorbent on the shell side may also act as a cooling heat transfer fluid. Each of $NH_3$, $H_2$ and $N_2$ may be diffusible through the reactor tube walls, but only $NH_3$ reacts with the liquid sorbent on the shell side. In some embodiments of this exemplary system, due to, for example, capital/operating constraints, pressure drop in tubes, etc., a reverse configuration may be utilized, with the liquid sorbent flowing through hollow permeable tubes, with the shell-side configured to contain catalyst and reactant.

Figure 7:
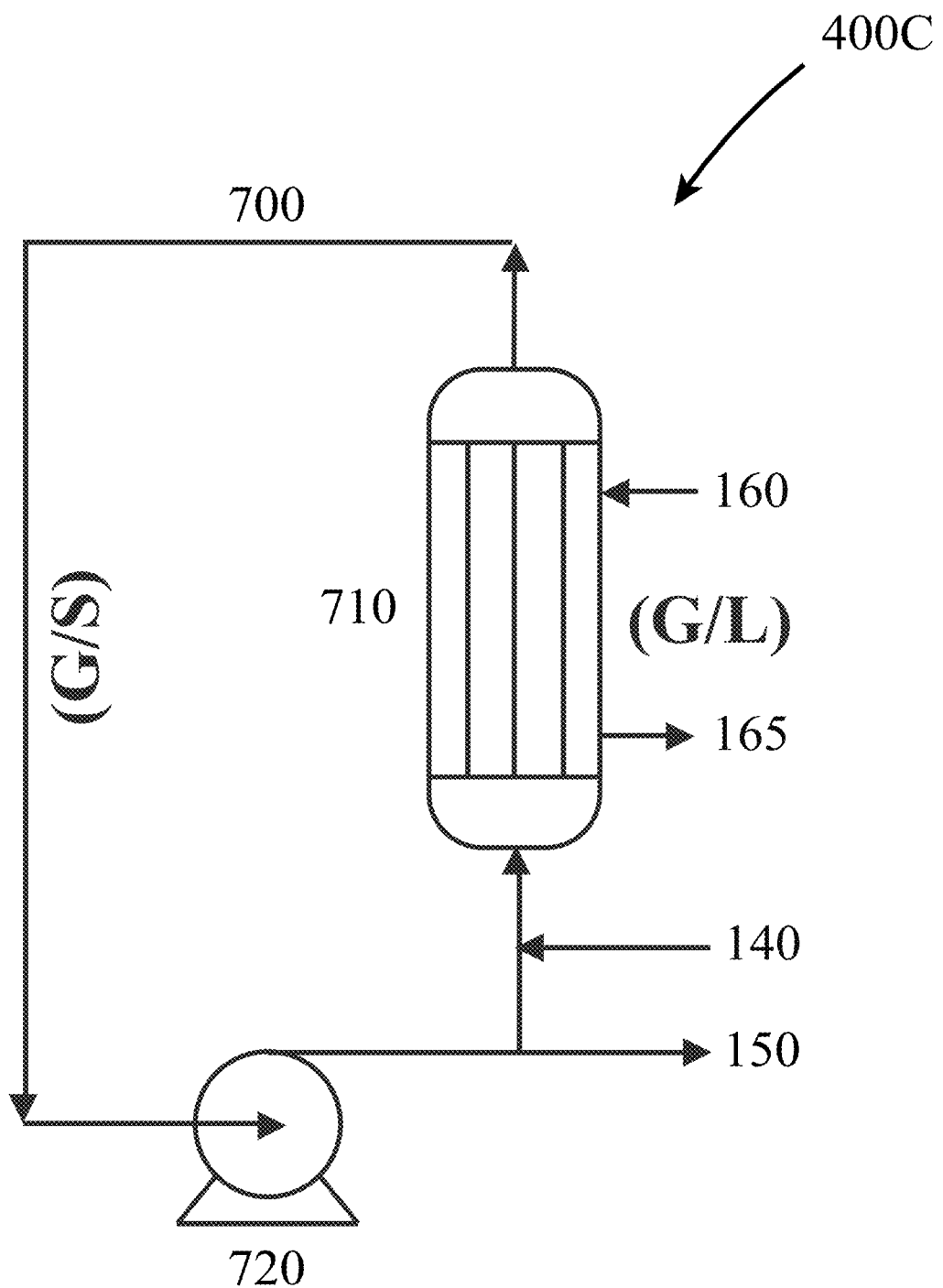

FIG. 7 illustrates a third example of an ammonia synthesis/recovery system 400C, configured as a loop reactor 700 (G/S) with a heat exchanger 710 positioned in the loop and a pump 720 providing the motive force to circulate the gas/solid mixture through the loop reactor 700. and $NH_3$ absorption, according to some embodiments of the present disclosure. A loop reactor 700 may include a reactor vessel consisting of a loop, e.g., open tubing, with a heat exchanger 710 positioned in the loop, and a pump 720 to cycle reactants, products, and/or catalyst through the loop. The pump provides the pressure to provide the flow through the loop, and flow through the loop provides inter/intraphase mixing. The reactor, i.e., loop, may contain gas and solids. Benefits include higher operating pressures. In some embodiments of the present disclosure, such a loop system may include multiple loops, pumps, and/or heat exchangers, etc. In some embodiments of the present disclosure, ammonia synthesis may be performed adiabatically over a packed bed of catalyst positioned in at least a portion of a loop, while providing a flow of pristine, cold liquid sorbent as coolant to a heat exchanger.

Similar to the exemplary system 400B illustrated in FIG. 6, the reactant mixture ($H_2$, $N_2$, and ammonia) may flow through the heat exchanger on the "tube-side" of the heat exchanger 710, with the liquid sorbent flowing through the "shell-side". Therefore, the tubes may be manufactured using a gas permeable material that enables the ammonia produced in the loop reactor 700 to flow from the tube-side, through tube walls, into the liquid sorbent on the shell-side. Referring again to FIG. 7, ammonia-lean liquid sorbent 160 enters the heat exchanger and receives ammonia from the tubes and then redirects the ammonia-rich liquid sorbent 165 to an ammonia recovery unit operation (i.e., second zone 124) to generate the targeted ammonia stream 170. $N_2/H_2$ feed 140 may be fed to the loop reactor 700 before the heat exchanger 710. Unreacted $N_2$ and $H_2$, also containing ammonia, may exit the loop as an ammonia-rich gas stream 150. This ammonia product stream 420 may then be directed to an ammonia recovery unit that also utilizes the liquid sorbent (in a first zone 122, not shown) to separate the ammonia from the $N_2$ and the $H_2$. Instead of a shell/tube heat exchanger, in some embodiments of the present disclosure, a heat exchanger may utilize direct G/L contacting to facilitate (i) $NH_3$ absorption/desorption, and (ii) cooling of unreacted $H_2/N_2$ for recycle to catalytic reactor loop.

Figure 8:
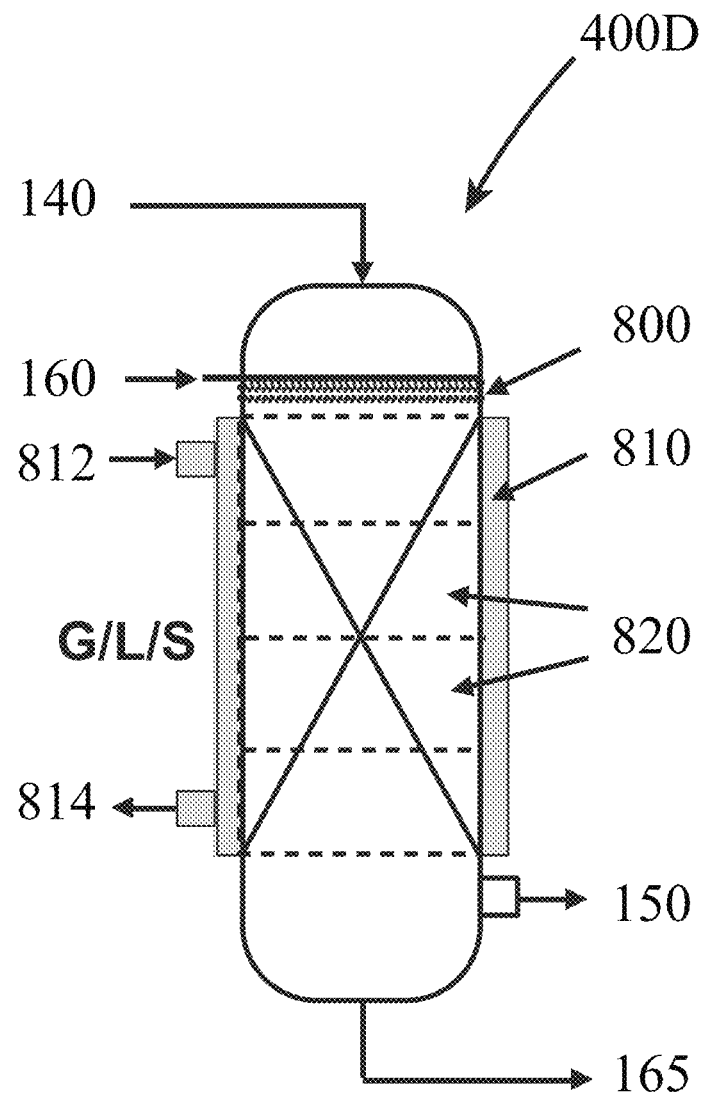

FIG. 8 illustrates a fourth example of an ammonia synthesis/recovery system 400D, configured as a trickle bed reactor for gas/liquid/solid (G/L/S) service with integrated $NH_3$ synthesis and absorption, according to some embodiments of the present disclosure. In this exemplary ammonia synthesis/recovery system 400D, the $N_2/H_2$ feed stream 140 is directed to the top of a column. Also directed to the top of the column is an ammonia-lean liquid sorbent stream 160, which passes through a liquid distributor 800 to facilitate contacting of the ammonia-lean liquid sorbent stream 160 with the of the $N_2/H_2$ feed stream 140, which then flow through the column. Additional mixing of the liquid and gas components are facilitated by packing the column with a solid catalyst to catalyze the ammonia synthesis. In some embodiments of the present disclosure, the column may also be packed with an inert packing. The catalyst and/or packing are referred to collectively as packing 420, for this exemplary system. After the gas and liquid sorbent have flowed through the column, the gas and liquid phases are separated, resulting in an ammonia-rich gas stream 150 (a gas stream) and an ammonia-rich liquid sorbent stream 165. The ammonia-rich liquid sorbent stream 165 may then be directed to an ammonia desorption step (i.e. a second zone 124) to desorb the ammonia from the ammonia-acid complex to form the targeted pure ammonia stream 170. The ammonia-rich gas stream 150 may then be directed to another ammonia removal step, using the liquid sorbent (not shown). Since the synthesis of ammonia is exothermic, the column may be configured with a cooling jacket 810. A coolant inlet 812 and coolant outlet 814, leading to and from the cooling jacket 810 are shown.

Referring again to FIG. 8, a trickle bed may include co-current downflow, utilizing a liquid distributor component for liquid sorbent feed, while a packed bubble column is the term for the same type of reactor operated in co-current bottom-up configuration, requiring a gas distributor component for gas feed. In some embodiments of the present disclosure, such a system may also feature countercurrent contacting. (Recycle loops are not illustrated for any contacting pattern and/or flow configuration.) For ammonia synthesis and separation, the gas fed to the reactor is $N_2$ and $H_2$ while a liquid feed to the reactor may include an ammonia-lean and relatively warm stream of the liquid sorbent. The solid catalyst may become covered in a thin film of sorbent. Thus, the gas may not directly contact the catalyst, but instead may dissolve into the liquid sorbent. This configuration may have the advantage of providing very rapid $NH_3$ absorption.

Figure 9:
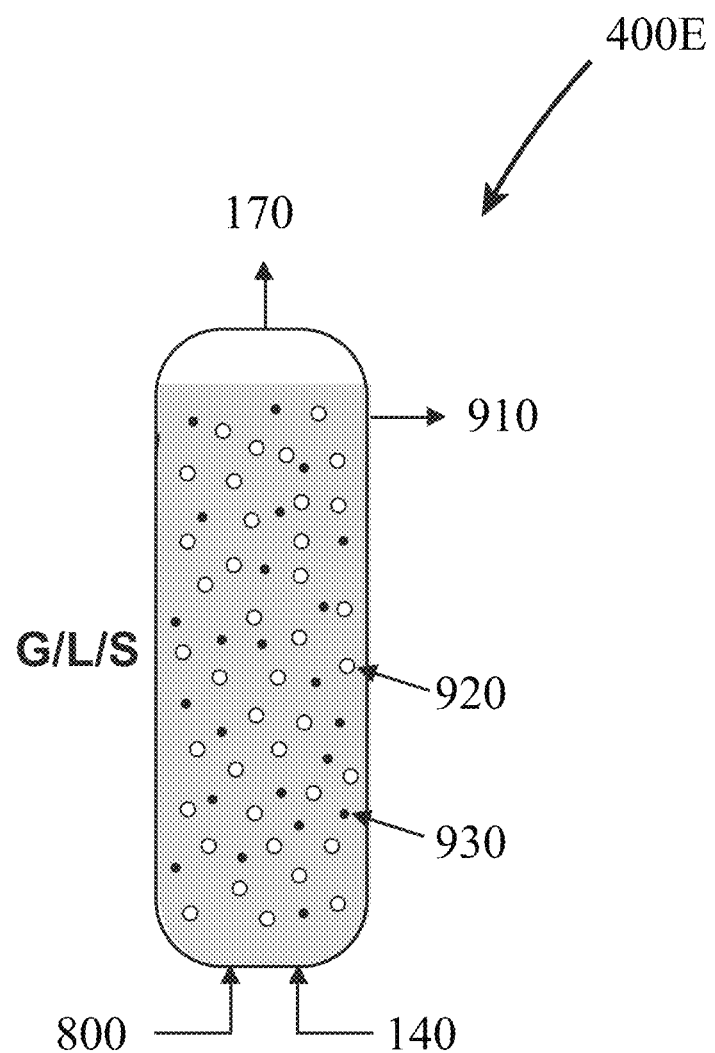

FIG. 9 illustrates a fifth example of an ammonia synthesis/recovery system 400E, configured as a slurry bubble column (G/L/S) with integrated $NH_3$ synthesis and absorption, according to some embodiments of the present disclosure. A slurry bubble column features co-current bottom-up flow for all G/L/S phases, which is distinct from a trickle bed, as in FIG. 8, or a packed bubble column where the catalyst exists as a fixed bed. Therefore, in this example, the $N_2/H_2$ feed stream 140 is directed to the bottom of the column along with an inlet slurry 900 of the solid ammonia synthesis catalyst mixed with the ammonia-lean liquid sorbent. The slurry 900 then mixes with the $N_2/H_2$ feed stream 140 and flows up through the column as a mixture of gas bubbles 920 and suspended catalyst 930 particles dispersed in the liquid sorbent. The liquid sorbent complexes with the ammonia as it is produced in the column to form an outlet slurry 910 containing ammonia-rich liquid sorbent and solid catalyst and an ammonia-rich gas stream 150 containing ammonia and unreacted $H_2$ and/or $N_2$. The outlet slurry 910 may then be directed to downstream unit operations to separate the ammonia from the ammonia-rich liquid sorbent (e.g., in a second zone 124 as described above) to form the targeted pure ammonia stream 170. The catalyst may also be separated from the liquid sorbent to enable its recover and recycle. The ammonia-rich gas stream 150 may then be directed to an ammonia recovery unit that also utilizes the liquid sorbent (in a first zone 122, not shown) to separate the ammonia from the $N_2$ and the $H_2$.

Referring again to FIG. 9, in some embodiments of the present disclosure, such a system may be configured for countercurrent contacting. In some embodiments of the present disclosure, such a system may also include an external and/or internally integrated heat exchanger (recycle loops not illustrated). In some embodiments of the present disclosure, such a system may exist as an open, trayed/baffled, multishaft and/or looped configuration to enable desired contacting patterns, hydrodynamics and residence times. As in the trickle bed example, the gas fed to the reactor is $N_2$ and $H_2$, while a liquid feed to the reactor may include an ammonia-lean and relatively warm stream of the liquid sorbent. The solid catalyst may be flowable (e.g., fine suspended particles) and may become covered in a thin film of sorbent. Thus, the gas may not directly contact the catalyst, but instead may dissolve into the liquid sorbent. This configuration may also have the advantage of providing very rapid $NH_3$ absorption.

Near-isobaric integration of liquid absorption with Haber-Bosch ammonia synthesis reactors could be carried out as separate steps (see FIG. 1 and FIG. 2), or it could feature multiple temperature zones to facilitate intensified, in situ $NH_3$ capture; practically, established adiabatic reaction engineering strategies such as interstage cooling could conceivably incorporate a 'cold' liquid sorbent injected directly between reactor stages to capture 'hot' $NH_3$ product, to cool unreacted $N_2$ and $H_2$ and to reset the equilibrium for the subsequent catalyst bed stage—all while obviating the substantial energy and work required to decompress, condense, recompress and recycle the gaseous reactant streams in conventional Haber-Bosch processes. Importantly, the incompressible nature of liquid sorbents intrinsically minimizes pump work required for liquid sorbent recycle loops (see FIG. 1 and FIG. 2), offering the potential to mitigate nearly one-fifth of the energy footprint and associated levelized costs incurred by the incumbent chemical process.

Intensified synthesis and absorption could further directly lower reactor capital costs from active $NH_3$ capture (and thus lower operating pressure) as well as increase throughput per volume due to the associated favorable equilibrium shift. Further, emerging low-temperature ammonia synthesis reactor concepts such as electrochemical reactors or microwave reactors may allow for generation of ammonia product at temperatures below 300° C. or even near ambient temperature; such reactors may also benefit from sorbent-enhanced ammonia recovery strategies. Myriad sorbent/reaction fluid compositions, contacting methods and process intensification approaches exist, some of which are described herein.

Figure 10:
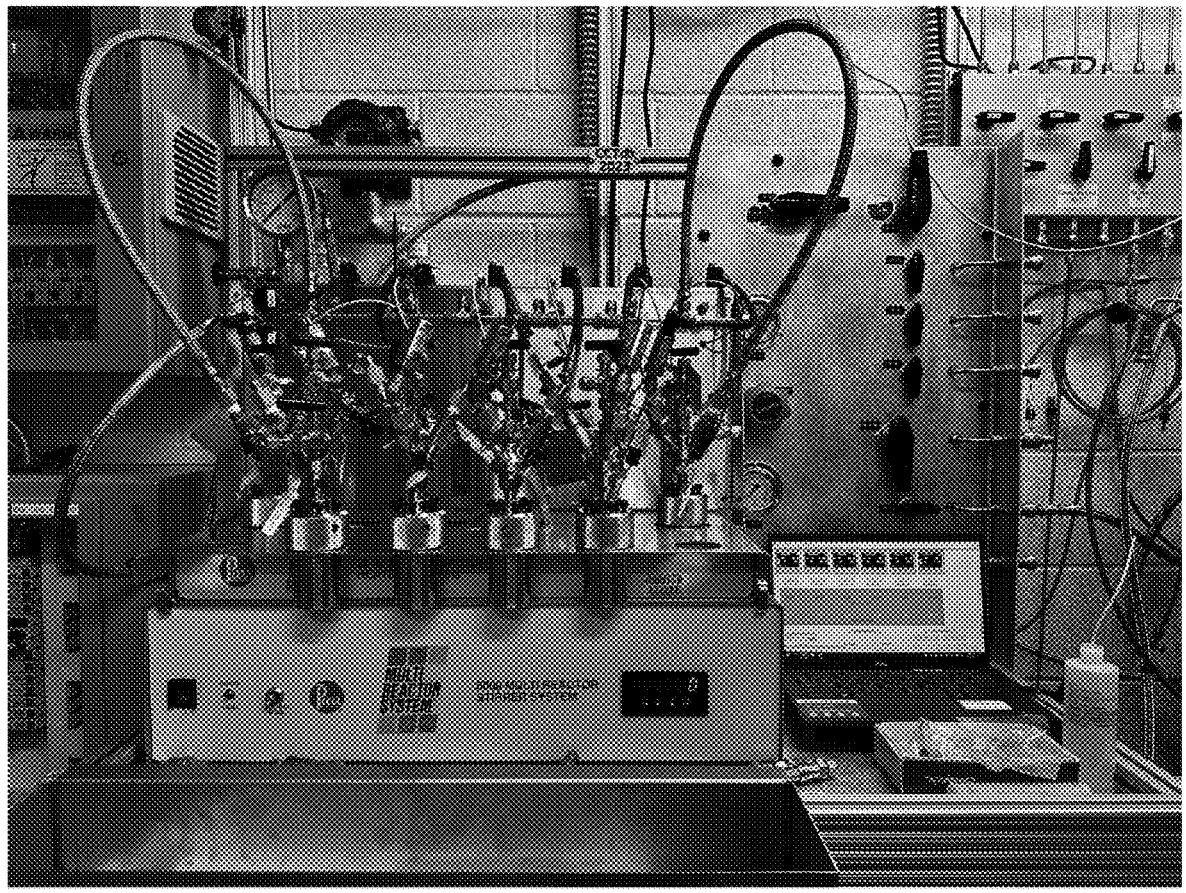
FIG. 10 illustrates an experimental setup designed to study the reversible absorption and desorption of ammonia by acids, according to some embodiments of the present disclosure.

Experimental:

FIG. 10 illustrates an experimental system constructed to evaluate the ability of $H_3PO_4$ to reversible absorb, i.e., complex with, ammonia according to Reaction 3A above, which is repeated here for convenience. Two additional relevant reactions are also shown, Reaction 3B and Reaction 3C.

$H_3PO_4 + NH_3 \leftrightarrow (NH_4)H_2PO_4$  Reaction 3A

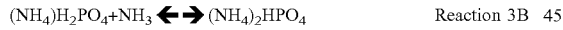

$(NH_4)H_2PO_4 + NH_3 \leftrightarrow (NH_4)_2HPO_4$  Reaction 3B

$H_4P_2O_7 + H_2O \leftrightarrow H_3PO_4$  Reaction 3C

Referring to these reactions, $(NH_4)H_2PO_4$ is monoammonium phosphate, abbreviated MAP herein. $(NH_4)_2HPO_4$ is diammonium phosphate, abbreviated DAP herein. Pyrophosphoric acid, $H_4P_2O_7$, was used in the experiments described below to titrate (i.e., remove) water (Reaction 3C) contained in starting mixtures of MAP and/or DAP that were then contacted with ammonia. Referring again to FIG. 10, the contacting of MAP and/or DAP with ammonia was completed in 75-mL Parr reactors. The experimental system used was a six-well custom Parr batch reactor. The experimental procedure included the following basic steps:

1. Charge the Parr reactor(s) with a target volume of 85 wt % phosphoric acid and $H_4P_2O_7$ to titrate the water.
2. Purge the headspace in the reactor with argon.
3. Dose (i.e., add) ammonia vapor to a specified pressure and monitor the change in pressure over time.
4. Add additional doses of ammonia until an equilibrium uptake of ammonia is observed as indicated by a negligible drop in head space upon/after addition of ammonia.
5. Calculate the moles of ammonia absorbed by the Ideal Gas Law, Equation 1 below.

$$n_{ammonia,dose} = (P_{start} - P_{finish}) * V_{vapor}/RT \quad \text{Equation 1}$$

Referring to Equation 1, $P_{start}$ corresponds to the starting pressure in the Parr reactor after adding ammonia, $P_{finish}$ corresponds to the final pressure in the reactor after uptake of ammonia by the acid, $V_{vapor}$ is the volume of the gas head space in the reactor, T is the reactor temperature, and R is the ideal gas law constant (8.314 $m^3 \cdot Pa \cdot K^{-1} \cdot mol^{-1}$).

Figure 11A:
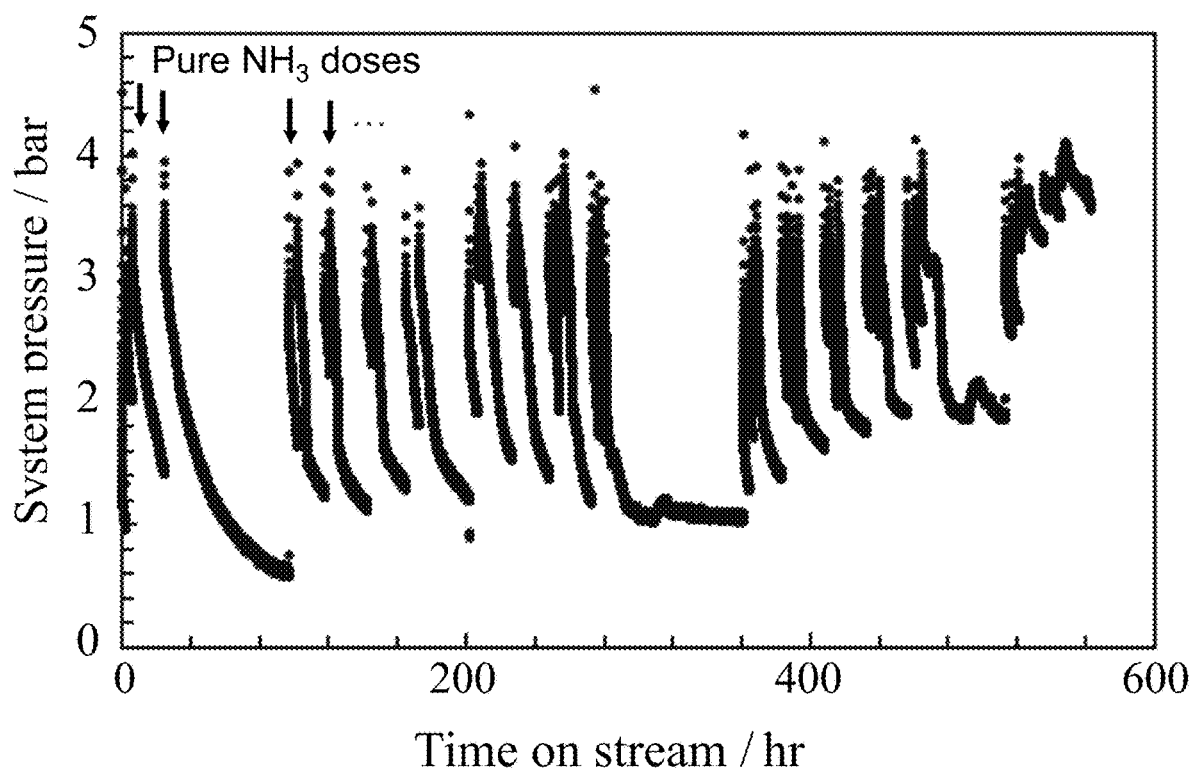
FIG. 11A illustrates a plot of ammonia absorption by $H_3PO_4$ as measured by system pressure versus time, according to some embodiments of the present disclosure.

FIG. 11A illustrates an exemplary set of experimental results obtained using this procedure. Specifically, a single 75 ml Parr reactor was charged with $H_3PO_4$/water/$H_4P_2O_7$ resulting in a starting composition equivalent to about 16.0 g of $H_3PO_4$. Approximately 48 separate doses of ammonia were added to the reactor at an essentially constant target temperature of 25° C. However, the temperatures increased between 10° C. and 20° C. due to the heat of adsorption of ammonia into the liquid sorbent. FIG. 11B tabulates the raw data used to generate plot illustrated in FIG. 11A. The total amount of ammonia absorbed was calculated to be about 0.214 gmol corresponding to about 3.6 g of ammonia, corresponding to about 0.25 g ammonia/g $H_3PO_4$ or a molar ratio of about 1.46 gmol ammonia/gmol $H_3PO_4$.

Batch desorption experiments were completed using the same experimental setup illustrated in FIG. 10, targeting the reverse reactions of Reactions 3A and 3B shown above. The following protocol was performed.

1. Charge the reactor with a specific amount of MAP and/or DAP. (Note that MAP and DAP remain at least partially solidified until a temperature of about 150° C. is reached.)
2. Purge the reactor with argon and then pressurize with argon to between 3 bar and 5 bar.
3. Heat the system to a specified starting temperature of 25° C. and complete a 6 hour wait period to let the system reach equilibrium and record the equilibrium pressure.
4. Increase the temperature of the system by 25° C. and complete a 6 hour wait period to let the system reach equilibrium and record the equilibrium pressure. Repeat until a final target temperature of about 250° C.
5. Calculate the amount of ammonia released by the Ideal Gas law.

Figure 12A:
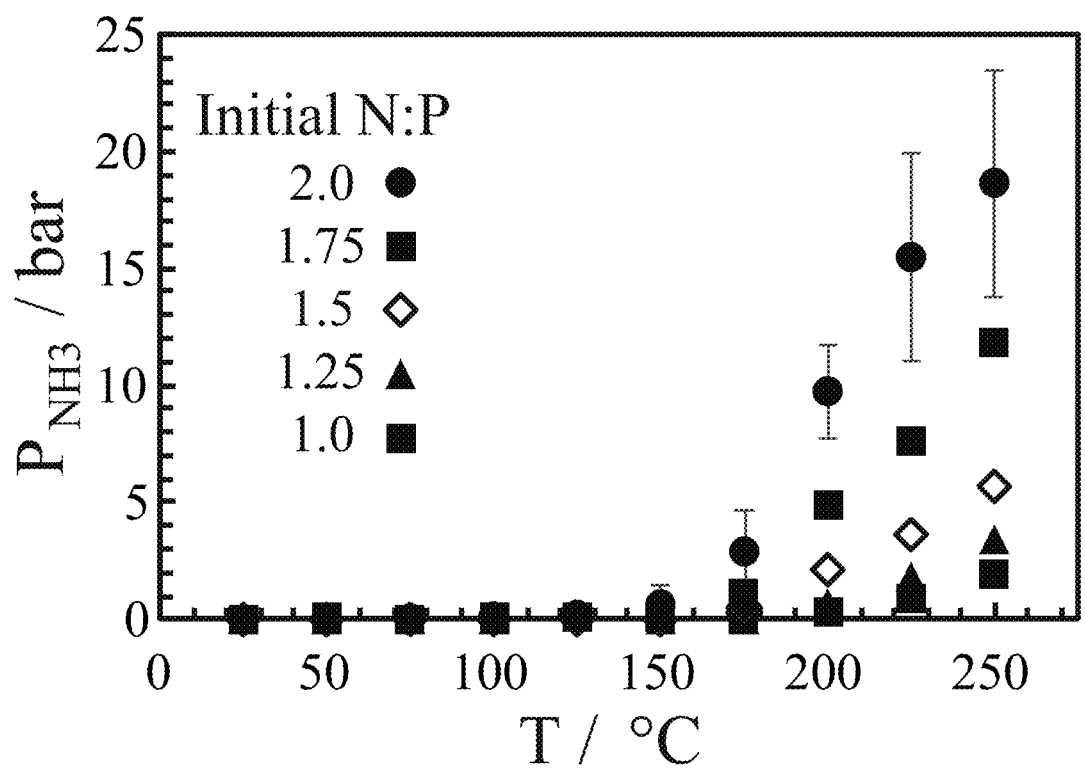
FIG. 12A illustrates the desorption of ammonia, as measured by system pressure, from $(NH_4)H_2PO_4$ (monoammonium phosphate, abbreviated MAP) and $(NH_4)_2HPO_4$ (diammonium phosphate, abbreviated DAP) versus system temperature, according to some embodiments of the present disclosure.
Figure 12B:
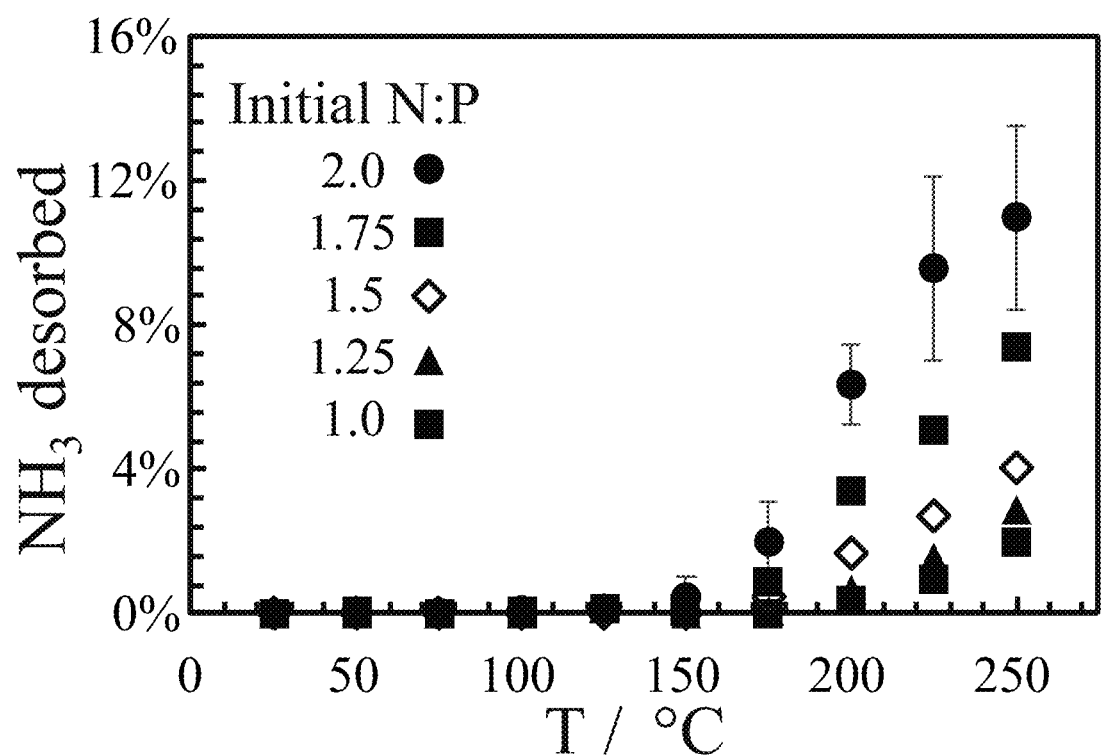
FIG. 12B illustrates the percentage of starting ammonia released based on the starting amounts of MAP and/or DAP, as calculated from the system pressures illustrated in FIG. 12A, according to some embodiments of the present disclosure.
Figure 12C:
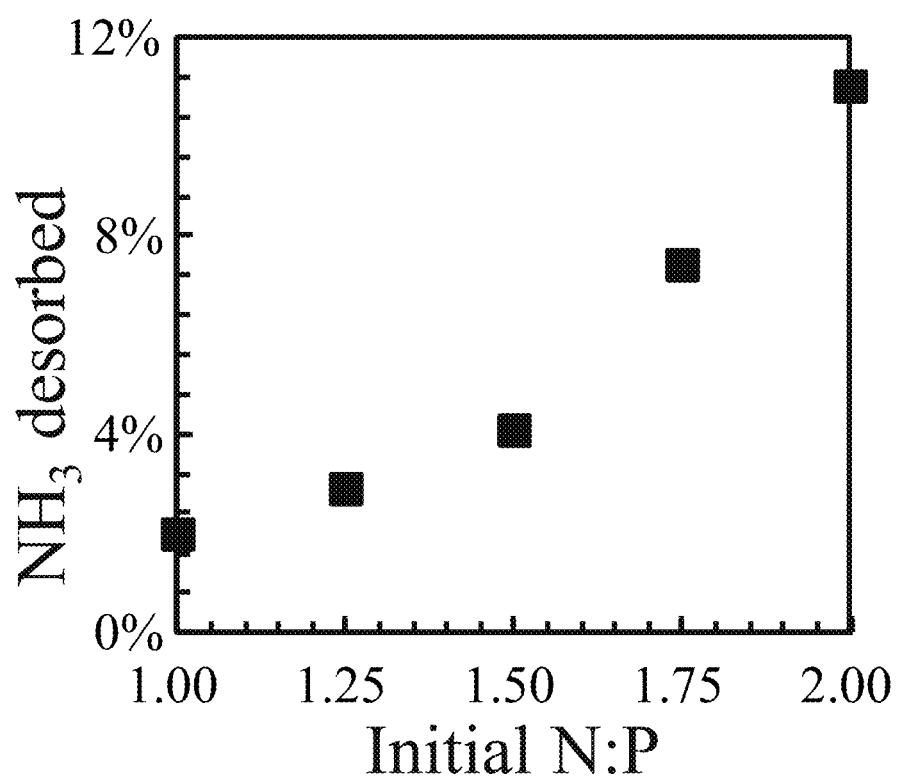
FIG. 12C illustrates the change in the percentage of starting ammonia released as a function of the starting amount of ammonia as measured by the ratio of ammonia to $PO_4$ present in the starting mixture, according to some embodiments of the present disclosure.

FIGS. 12A, 12B, and 12C illustrate experimental results obtained via this desorption protocol using differing starting amounts of MAP and DAP. "N:P" refers to the theoretical starting molar ratio of $NH_3$ to $PO_4$ based on the starting masses of MAP and DAP charged to the reactor. FIG. 12A illustrates the pressure generated in the Parr reactor as a function of temperature (where the "2.0" data set corresponds to pure DAP, "1.0" to pure MAP, and "1.5" to a 50:50 molar ratio) and FIG. 12B illustrates the resulting percentage of the ammonia released from the theoretical starting amounts present in the initial charge of MAP and DAP. These data show that DAP more readily releases its ammonia than MAP, with an approximate 5.5× increase at 250° C.

Figure 13:
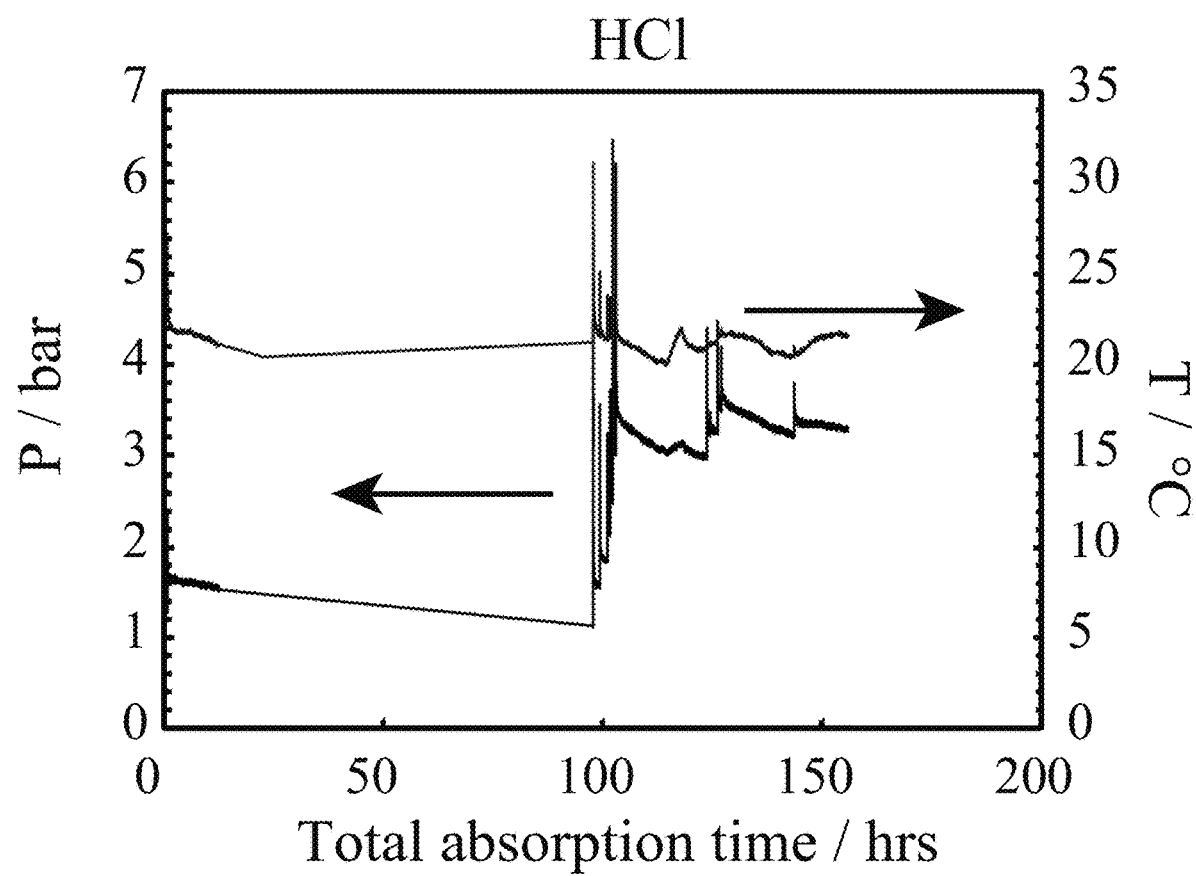
FIG. 13 illustrates a plot of ammonia absorption by HCl as measured by system pressure versus time, according to some embodiments of the present disclosure.

Other acids have been tested as possible liquid sorbents for ammonia, in addition to $H_3PO_4$. These include HCl, $H_2SO_4$, $HNO_3$, oxalic acid $(COOH)_2$, acetic acid $(CH_3COOH)$, formic acid (HCOOH), and citric acid $(HOC(CH_2CO_2H)_2)$. The experimental results obtained using the Parr reactor system for HCl is shown if FIG. 13. Rapid uptake of ammonia is illustrated by various pressure spikes and their rapid decays throughout the course of the experiment. The experimental results for all of these acids are tabulated below.

TABLE 1

Acid Absorption Results

| Acid | pKa (1st H+) | ΔH NH$_4^+$ salt/(kJ/mol) | NH$_3$ uptake/mol | $n_{NH3}/n_{Acid}$ (uptake) | $n_{NH3}/n_{H+}$ (uptake) | Maximum ΔT (observed)/° C. |
|---|---|---|---|---|---|---|
| H$_3$PO$_4$ | 2.5 | −127.4 | 0.10 | 1.9 | 0.65 | 13 |
| HCl | −6.3 | −176.3 | 0.13 | 2.6 | 2.6 | 24 |
| H$_2$SO$_4$ | −3 | +33.73 | 0.06 | 1.1 | 0.55 | 15 |
| HNO$_3$ | −1.4 | −185 | 0.12 | 2.7 | 2.7 | 19 |
| Oxalic acid | 1.23 (4.26) | −503 (2 NH$_4^+$) | 0.052 | 1.0 | 0.51 | 9.9 |
| Acetic acid | 4.75 | −131 | 0.075 | 1.5 | 1.5 | 5.1 |
| Formic acid | 3.75 | −131 | 0.054 | 1.1 | 1.1 | 12.9 |
| Citric acid | 3.1 (4.7, 6.4) | Not tabulated. | 0.076 | 1.5 | 0.51 | 2.4 |

These data show that both HCl and HNO$_3$ have a high uptake capacity for ammonia than H$_3$PO$_4$.

Figure 14:
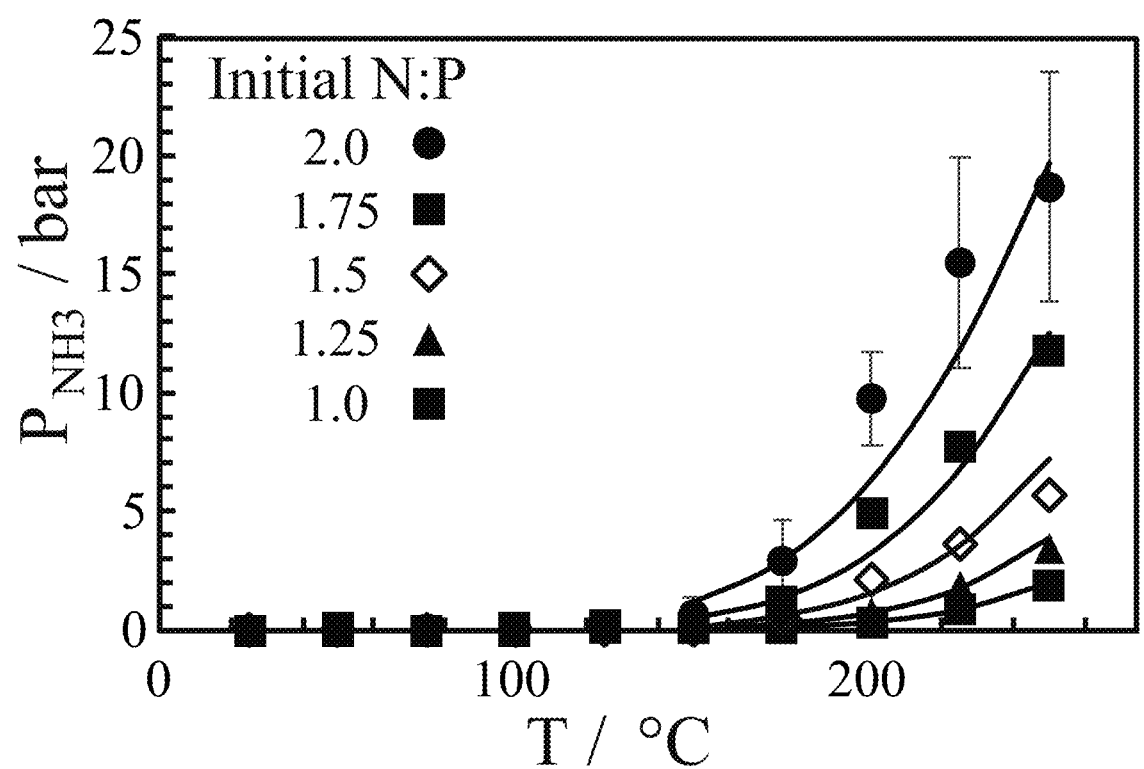
FIG. 14 illustrates a comparison of experimental desorption of ammonia from $H_3PO_4$ versus values predicted by a model (lines), according to some embodiments of the present disclosure.

FIG. 14 illustrates desorption modeling results compared to the experimental data illustrated in FIG. 12A. This shows that the model fits the experimental data very well.

EXAMPLES

Example 1. A method comprising: in a first zone, contacting an ammonia-rich gas comprising ammonia with an ammonia-lean liquid sorbent resulting in the reversible transfer of at least a portion of the ammonia from the ammonia-rich gas to the ammonia-lean liquid sorbent, thereby forming an ammonia-rich liquid sorbent and an ammonia-lean gas; and in a second zone, removing at least a portion of the ammonia from the ammonia-rich liquid sorbent to form gaseous ammonia and regenerate the ammonia-lean liquid sorbent.

Example 2. The method of Example 1, wherein the regenerated ammonia-lean liquid sorbent is cycled back to the first zone.

Example 3. The method of Example 1, wherein: the first zone is maintained at a first pressure, and the second zone is maintained at a second pressure that is lower than the first pressure.

Example 4. The method of Example 1, wherein the first pressure is between 5 bar and 300 bar or between 5 bar and 100 bar.

Example 5. The method of Example 1, wherein the second pressure is between 0 bar and 100 bar or between 0 bar and 10 bar.

Example 6. The method of Example 1, wherein: the first zone is maintained at a first temperature, and the second zone is maintained at a second temperature that is lower than the first temperature.

Example 7. The method of Example 1, wherein the first temperature is between 100° C. and 600° C. or between 150° C. and 400° C.

Example 8. The method of Example 1, wherein the second temperature is between 100° C. and 600° C. or between 150° C. and 400° C.

Example 9. The method of Example 1, wherein the reversible transfer of ammonia in the first zone is exothermic.

Example 10. The method of Example 1, wherein the release of ammonia in the second zone is endothermic.

Example 11. The method of Example 1, wherein the ammonia is reversibly bonded within the ammonia-rich liquid sorbent by a bond comprising an ionic bond Example 12. The method of Example 1, wherein: the ammonia-lean liquid sorbent comprises an acid (HA), the ammonia-rich liquid sorbent comprises a complex of ammonia and the acid ((NH$_4$)A), the reversible transfer of ammonia comprises a reaction defined by x HA+y NH$_3$ ⇌ (NH$_4$)$_y$A$_x$, wherein: x=1, and 1≤y≤10.

Example 13. The method of Example 12, wherein the ammonia-rich liquid sorbent further comprises water in which the acid is present as at least one of a solute, a suspension, or a combination thereof.

Example 14. The method of Example 12, wherein the acid comprises a phosphoric acid.

Example 15. The method of Example 14, wherein the phosphoric acid comprises at least one of H$_3$PO$_4$, (NH$_4$)H$_2$PO$_4$, CsH$_2$PO$_4$, an alkyl phosphoric acid, a benzyl phosphoric acid, a perfluoroalkyl phosphoric acids, or a combination thereof.

Example 16. The method of Example 12, wherein: the acid (HA) comprises H$_3$PO$_4$, the complex comprises (NH$_4$)H$_2$PO$_4$, and the reversible transfer of ammonia comprises a reaction defined by H$_3$PO$_4$+NH$_3$ ⇌ 4(NH$_4$)H$_2$PO$_4$.

Example 17. The method of Example 16, wherein: the reversible transfer of ammonia further comprises a reaction defined by (NH$_4$)H$_2$PO$_4$+NH$_3$ ⇌ 4(NH$_4$)$_2$HPO$_4$, and the complex further comprises (NH$_4$)$_2$HPO$_4$.

Example 18. The method of Example 12, wherein: the acid (HA) comprises HCl, the complex comprises (NH$_4$)Cl, and the reversible transfer of ammonia comprises a reaction defined by HCl+NH$_3$ ⇌ 4(NH$_4$)Cl.

Example 19. The method of Example 12, wherein: the acid (HA) comprises H$_2$SO$_4$, the complex comprises (NH$_4$)HSO$_4$, and the reversible transfer of ammonia comprises a reaction defined by H$_2$SO$_4$+NH$_3$ ⇌ 4(NH$_4$)HSO$_4$.

Example 20. The method of Example 19, wherein: the reversible transfer of ammonia further comprises a reaction defined by NH$_4$)HSO$_4$+NH$_3$ ⇌ (NH$_4$)$_2$SO$_4$, and the complex further comprises (NH$_4$)$_2$SO$_4$.

Example 21. The method of Example 12, wherein: the acid (HA) comprises HNO$_3$, the complex comprises (NH$_4$)NO$_3$, and the reversible transfer of ammonia comprises a reaction defined by HNO$_3$+NH$_3$ ⇌ (NH$_4$)NO$_3$.

Example 22. The method of Example 12, wherein: the acid (HA) comprises HBF$_4$, the complex comprises (NH$_4$)BF$_4$, and the reversible transfer of ammonia comprises a reaction defined by HBF$_4$+NH$_3$ ⇌ (NH$_4$)BF$_4$.

Example 23. The method of Example 12, wherein: the acid (HA) comprises HSO$_3$CF$_3$, the complex comprises (NH$_4$)SO$_3$CF$_3$, and the reversible transfer of ammonia comprises a reaction defined by HSO$_3$CF$_3$+NH$_3$ 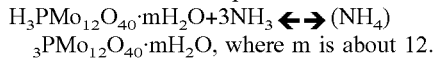 (NH$_4$)SO$_3$CF$_3$.

Example 24. The method of Example 12, wherein: the acid (HA) comprises H$_3$PMo$_{12}$O$_{40}$·mH$_2$O, the complex comprises (NH$_4$)$_3$PMo$_{12}$O$_{40}$·mH$_2$O, and the reversible transfer of ammonia comprises a reaction defined by H$_3$PMo$_{12}$O$_{40}$·mH$_2$O+3NH$_3$ 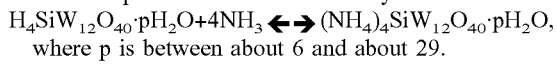 (NH$_4$)$_3$PMo$_{12}$O$_{40}$·mH$_2$O, where m is about 12.

Example 25. The method of Example 12, wherein: the acid (HA) comprises H$_3$PW$_{12}$O$_{40}$·nH$_2$O, the complex comprises (NH$_4$)$_3$PW$_{12}$O$_{40}$·nH$_2$O, and the reversible transfer of ammonia comprises a reaction defined by H$_3$PW$_{12}$O$_{40}$·nH$_2$O+3NH$_3$ ⇌ (NH$_4$)$_3$PW$_{12}$O$_{40}$·nH$_2$O, here n is between about 6 and about 24.

Example 26. The method of Example 12, wherein: the acid (HA) comprises H$_4$SiW$_{12}$O$_{40}$·pH$_2$O, the complex comprises (NH$_4$)$_4$SiW$_{12}$O$_{40}$·pH$_2$O, and the reversible transfer of ammonia comprises a reaction defined by H$_4$SiW$_{12}$O$_{40}$·pH$_2$O+4NH$_3$ ⇌ (NH$_4$)$_4$SiW$_{12}$O$_{40}$·pH$_2$O, where p is between about 6 and about 29.

Example 27. The method of Example 12, wherein the acid comprises at least one of citric acid, acetic acid, formic acid, or oxalic acid.

Example 28. The method of Example 1, wherein at least one of the first zone or the second zone are integrated into a single unit operation that includes an ammonia synthesis reactor.

Example 29. The method of Example 1, wherein the first zone and the second zone are integrated into a single unit operation that is physically separate from an ammonia synthesis reactor.

Example 30. The method of Example 1, wherein the ammonia-rich gas further comprises at least one of H$_2$, N$_2$, or a combination thereof.

Example 31. The method of Example 1, wherein the first zone is positioned within a first contained volume comprising at least one of a vessel, a tank, a column, a shell, or a combination thereof.

Example 32. The method of Example 1, wherein: the first zone further comprises a gas distributor component configured to contact the ammonia-rich gas with the ammonia-lean liquid sorbent, and the gas distributor component is positioned within the first contained volume.

Example 33. The method of Example 32, wherein the gas distributor component comprises at least one of a dip tube, a perforated plate, a perforated ring, a porous plate, a sparger, a nozzle, a chimney tray, a bubble cap tray, a vapor lift distributor, or a combination thereof.

Example 34. The method of Example 31, wherein: the first contained volume has a high point and a low point, the ammonia-rich gas and the ammonia-lean liquid sorbent are both configured to enter at the low point, and the ammonia-lean gas and the ammonia-rich liquid sorbent are both configured to exit at the high point.

Example 35. The method of Example 32, wherein: the first zone further comprises an internal component comprising at least one of a baffle, a tray, inert packing, a static mixer, an impeller, a vertical shaft, or a combination thereof, and the internal component is positioned within the first contained volume.

Example 36. The method of Example 32, wherein: the first zone further comprises a liquid sorbent distributor component comprising at least one of an open-ended tubular distributor, capillary tubes, a perforated plate, a perforated ring, a porous plate, a sparger, a nozzle, a chimney tray, a helical ribbon, or a combination thereof, and the liquid distributor component is positioned within the first contained volume.

Example 37. The method of Example 36, wherein the liquid distributor component is positioned within a first contained volume.

Example 38. The method of Example 36, wherein: the first contained volume has a high point and a low point, the ammonia-rich gas and the ammonia-lean liquid are both configured to enter at the high point, and the ammonia-lean gas and the ammonia-rich liquid are both configured to exit at the low point.

Example 39. The method of Example 36, wherein: the first zone further comprises an internal component comprising at least one of a baffle, a tray, inert packing, a static mixer, an impeller, a vertical shaft, or a combination thereof, and the internal component is positioned within the first contained volume.

Example 40. The method of Example 1 wherein the second zone is positioned within a second contained volume comprising at least one of a vessel, a tank, a column, a shell, or a combination thereof.

Example 41. The method of Example 40, wherein the second zone further comprises at least one of an internal component, a liquid distributor component, a gas distributor component, or a combination thereof, as described above for the first zone.

Example 42. A system comprising: a contained volume comprising at least one of a vessel, a tank, a column, a shell, or a combination thereof, an ammonia synthesis portion positioned within the contained volume, and an ammonia recovery portion positioned within the contained volume, wherein: ammonia is synthesized within the ammonia synthesis portion, ammonia is removed via the ammonia recovery portion, an N$_2$/H$_2$ stream is directed to the contained volume, an ammonia-lean liquid sorbent stream is directed to the contained volume, an ammonia-rich liquid sorbent stream is removed from the contained volume, and at least one of an ammonia stream comprising H$_2$ and N$_2$ or a pure ammonia stream are removed from the contained volume.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A method comprising:
   in an ammonia synthesis reactor, reacting $H_2$ and $N_2$ to form an ammonia-rich gas;
   in a first zone, contacting the ammonia-rich gas with an ammonia-lean liquid sorbent comprising an acid (HA) resulting in reversible transfer of ammonia from the ammonia-rich gas to the ammonia-lean liquid sorbent, thereby forming an ammonia-rich liquid sorbent and an ammonia-lean gas; and
   in a second zone, removing ammonia from the ammonia-rich liquid sorbent to form gaseous ammonia and regenerate the ammonia-lean liquid, wherein:
   the acid comprises at least one of $CsH_2PO_4$, $HB_xF_y$, $HSO_3C_aF_b$, $H_3PMo_{12}O_{40} \cdot 12H_2O$, $H_3PW_{12}O_{40} \cdot nH_2O$, $H_4SiW_{12}O_{40} \cdot pH_2O$, or a combination thereof, $1 \leq x \leq 20, 4 \leq y \leq 42, 1 \leq a \leq 10, 3 \leq b \leq 21, 6 \leq n \leq 24$, and $6 \leq p \leq 29$.

2. The method of claim 1, wherein the regenerated ammonia-lean liquid sorbent is cycled back to the first zone.

3. The method of claim 1, wherein:
   the first zone is maintained at a first pressure, and
   the second zone is maintained at a second pressure that is lower than the first pressure.

4. The method of claim 3, wherein the first pressure is between 5 bar and 300 bar.

5. The method of claim 3, wherein the second pressure is between 0 bar and 100 bar.

6. The method of claim 1, wherein:
   the first zone is maintained at a first temperature, and
   the second zone is maintained at a second temperature that is lower than the first temperature.

7. The method of claim 6, wherein the first temperature is between 100° C. and 600° C.

8. The method of claim 6, wherein the second temperature is between 100° C. and 600° C.

9. The method of claim 1, wherein:
   the ammonia-rich liquid sorbent comprises a complex of ammonia and the acid $((NH_4)A)$,
   the reversible transfer of ammonia comprises a reaction defined by $HA + y\ NH_3 \leftrightarrow (NH_4)_y A_x$, wherein $1 \leq y \leq 10$.

10. The method of claim 9, wherein the ammonia-rich liquid sorbent further comprises water in which the acid is present as at least one of a solute, a suspension, or a combination thereof.

11. The method of claim 1, wherein at least one of the first zone or the second zone is integrated into a single unit operation that includes the ammonia synthesis reactor.

12. The method of claim 1, wherein the first zone and the second zone are integrated into a single unit operation that is physically separate from the ammonia synthesis reactor.

13. The method of claim 1, wherein the first zone is positioned within a first contained volume comprising at least one of a vessel, a tank, a column, a shell, or a combination thereof.

14. The method of claim 1, wherein the ammonia-rich gas further comprises at least one of unreacted $H_2$ or $N_2$.

15. The method of claim 14, wherein the ammonia-lean gas further comprises the unreacted $H_2$ or $N_2$ and the ammonia-lean gas is recycled to the reactor.

16. The method of claim 1, transferring heat from the ammonia-rich gas to the ammonia-lean gas.

17. The method of claim 13, wherein:
   the first contained volume has a high point and a low point, and
   the ammonia-rich gas and the ammonia-lean liquid sorbent are both configured to enter at the low point.

18. The method of claim 13, wherein:
   the first contained volume has a high point and a low point, and
   the ammonia-rich gas and the ammonia-lean liquid sorbent are both configured to enter at the high point.

19. The method of claim 13, wherein:
   the first contained volume has a high point and a low point, and
   the ammonia-lean liquid sorbent is configured to enter at the high point, and
   the ammonia-rich gas is configured to enter at the low point.

20. The method of claim 13, wherein:
the first contained volume has a high point and a low point, and
the ammonia-lean liquid sorbent is configured to enter at the low point, and
the ammonia-rich gas is configured to enter at the high point.

21. The method of claim 1, wherein the acid further comprises at least one of an alkyl phosphoric acid, a benzyl phosphoric acid, a perfluoroalkyl phosphoric acids, or a combination thereof.

* * * * *